(12) United States Patent
Tawara et al.

(10) Patent No.: US 10,175,050 B2
(45) Date of Patent: Jan. 8, 2019

(54) IMAGE PROCESSING DEVICE, IMAGE PROCESSING METHOD, AND PROGRAM

(71) Applicant: SONY CORPORATION, Tokyo (JP)

(72) Inventors: Tetsuo Tawara, Tokyo (JP); Atsushi Shionozaki, Tokyo (JP)

(73) Assignee: SONY CORPORATION, Tokyo (JP)

(*) Notice: Subject to any disclaimer, the term of this patent is extended or adjusted under 35 U.S.C. 154(b) by 156 days.

(21) Appl. No.: 14/896,025

(22) PCT Filed: Apr. 3, 2014

(86) PCT No.: PCT/JP2014/059809
§ 371 (c)(1),
(2) Date: Dec. 4, 2015

(87) PCT Pub. No.: WO2014/203592
PCT Pub. Date: Dec. 24, 2014

(65) Prior Publication Data
US 2016/0123742 A1 May 5, 2016

(30) Foreign Application Priority Data

Jun. 17, 2013 (JP) ................................ 2013-126617

(51) Int. Cl.
*H04N 7/00* (2011.01)
*G01C 21/20* (2006.01)
(Continued)

(52) U.S. Cl.
CPC .......... *G01C 21/206* (2013.01); *G01C 21/20* (2013.01); *G01C 21/3602* (2013.01);
(Continued)

(58) Field of Classification Search
CPC . H04N 7/00; H04N 7/18; H04W 4/04; H04W 4/027; H04W 4/02; H04W 64/00
(Continued)

(56) References Cited

U.S. PATENT DOCUMENTS 9,546,879 B2 * 1/2017 Yu ....................... G01C 21/3438
9,715,743 B2 * 7/2017 Kasahara ................ G06T 11/00
(Continued)

FOREIGN PATENT DOCUMENTS

CN 102056080 A 5/2011
EP 1959237 A1 8/2008
(Continued)

OTHER PUBLICATIONS

Feb. 3, 2017, EP communication issued for related EP application No. 14813032.1.
(Continued)

*Primary Examiner* — Daquan Zhao
(74) *Attorney, Agent, or Firm* — Paratus Law Group, PLLC

(57) ABSTRACT

To provide navigation to a destination to a user even in a state in which acquisition of a current position via a positioning module is difficult. There is provided an image processing device including: an image acquisition unit configured to acquire an image onto which a real object including a visual recognition target is projected; a recognition unit configured to recognize relative arrangement of a terminal that has captured the image to the real object by executing image recognition of the recognition target; and a control unit configured to display a display object indicating a direction toward a destination of a user on a screen of the terminal on the basis of the relative arrangement of the terminal recognized by the recognition unit.

21 Claims, 23 Drawing Sheets

(51) Int. Cl.
  *G06T 11/00* (2006.01)
  *G01C 21/36* (2006.01)
  *G06K 9/00* (2006.01)
  *G06F 3/041* (2006.01)
  *G06F 3/0481* (2013.01)
  *G06F 3/0484* (2013.01)
  *H04N 5/225* (2006.01)
  *H04N 7/18* (2006.01)
  *G08G 1/005* (2006.01)

(52) U.S. Cl.
  CPC ........ *G06F 3/0412* (2013.01); *G06F 3/04817* (2013.01); *G06F 3/04842* (2013.01); *G06K 9/00664* (2013.01); *G06T 11/00* (2013.01); *H04N 5/225* (2013.01); *G08G 1/005* (2013.01)

(58) Field of Classification Search
  USPC .................................................. 348/116, 61
  See application file for complete search history.

(56) References Cited

U.S. PATENT DOCUMENTS

| | | |
|---|---|---|
| 2006/0136129 A1 | 6/2006 | Yokozawa |
| 2007/0112509 A1* | 5/2007 | Kikuchi ................. G06Q 10/04 |
| | | 701/423 |
| 2011/0159858 A1 | 6/2011 | Yu et al. |

FOREIGN PATENT DOCUMENTS

| | | |
|---|---|---|
| EP | 2317281 A2 | 5/2011 |
| JP | 2003-244488 | 8/2003 |
| JP | 2006-170872 | 6/2006 |
| JP | 2008-309530 | 12/2008 |
| JP | 2011-107740 | 6/2011 |
| JP | 2012-032339 | 2/2012 |
| JP | 2012-079129 | 4/2012 |
| JP | 2013-019967 | 1/2013 |

OTHER PUBLICATIONS

Aug. 1, 2017, CN communication issued for related CN application No. 201480032897.4.

Nov. 14, 2017, Japanese Office Action issued for related JP application No. 2015-522611.

Apr. 18, 2018, Chinese Office Action issued for related CN Application No. 201480032897.4.

* cited by examiner

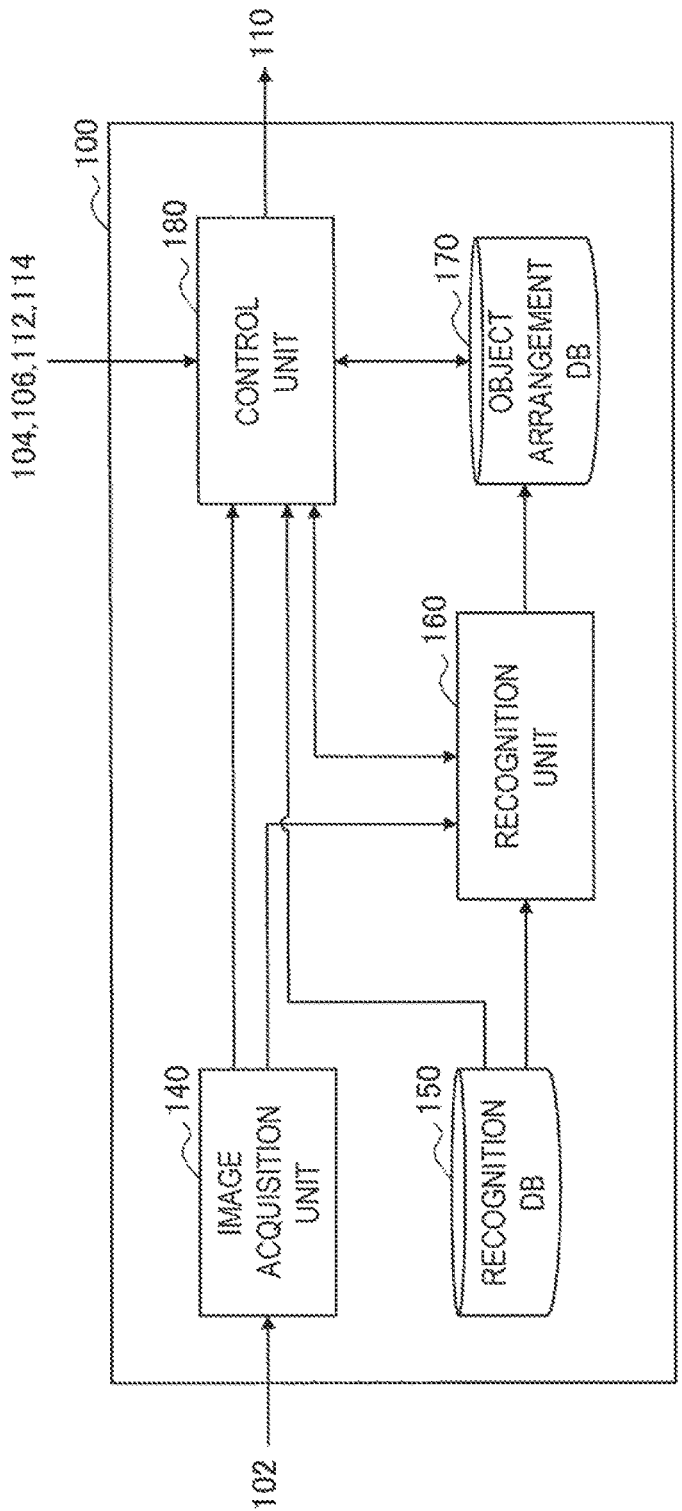

FIG. 8A

| OBJECT ID | TYPE | NAME | GEOGRAPHICAL POSITION | POSTURE |
|---|---|---|---|---|
| PO11 | DIRECTION BOARD | Station X Exit A | X11 | W11 |
| PO12 | DIRECTION BOARD | Station X Exit B | X12 | W12 |
| : | : | : | : | : |
| PO21 | DESTINATION | Central Park | X21 | / |
| PO22 | DESTINATION | National Museum | X22 | / |
| : | : | : | : | : |

FIG. 8B

| CODE ID 172b | NAME 174 | DESTINATION ID 177 | DESTINATION NAME 178 | RELATIVE ARRANGEMENT 179 |
|---|---|---|---|---|
| PC11 | Station X Exit A | PC21 | Central Park | RA11 |
|  |  | PC22 | National Museum | RA12 |
|  |  | : | : | : |
| PC12 | Station X Exit B | PC25 | Memorial Tower | RA25 |
|  |  | PC26 | Royal Palace | RA26 |
|  |  | : | : | : |
| : |  | : | : | : |

171b

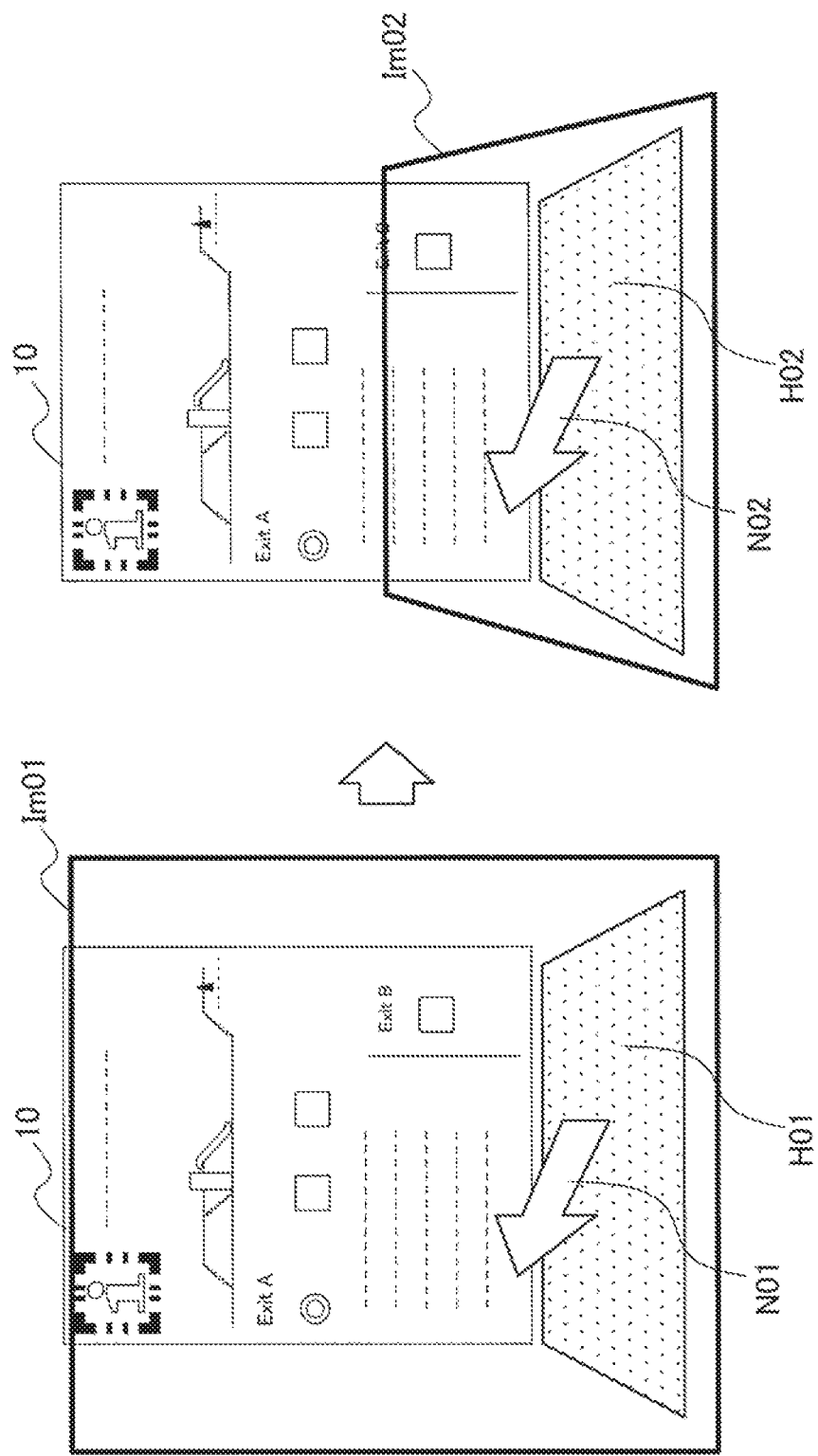

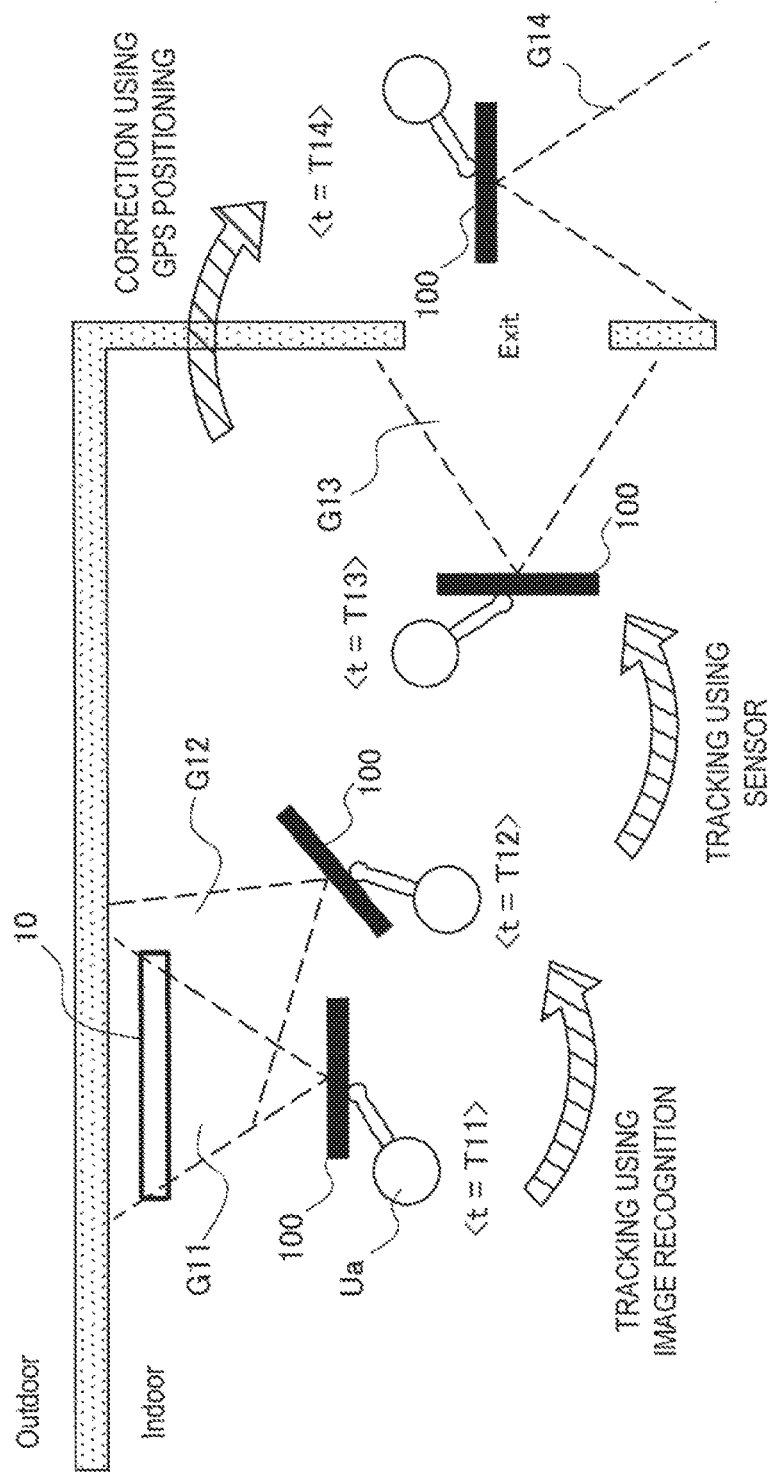

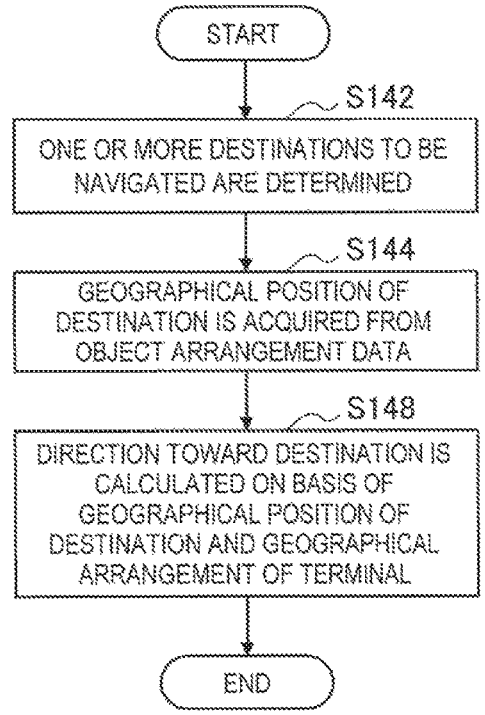
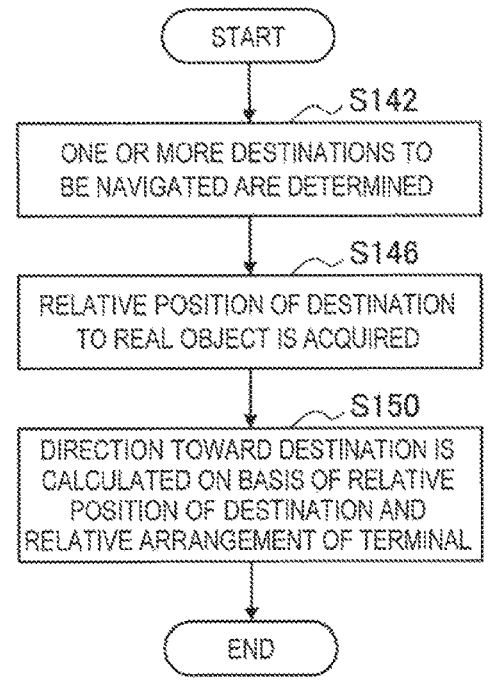

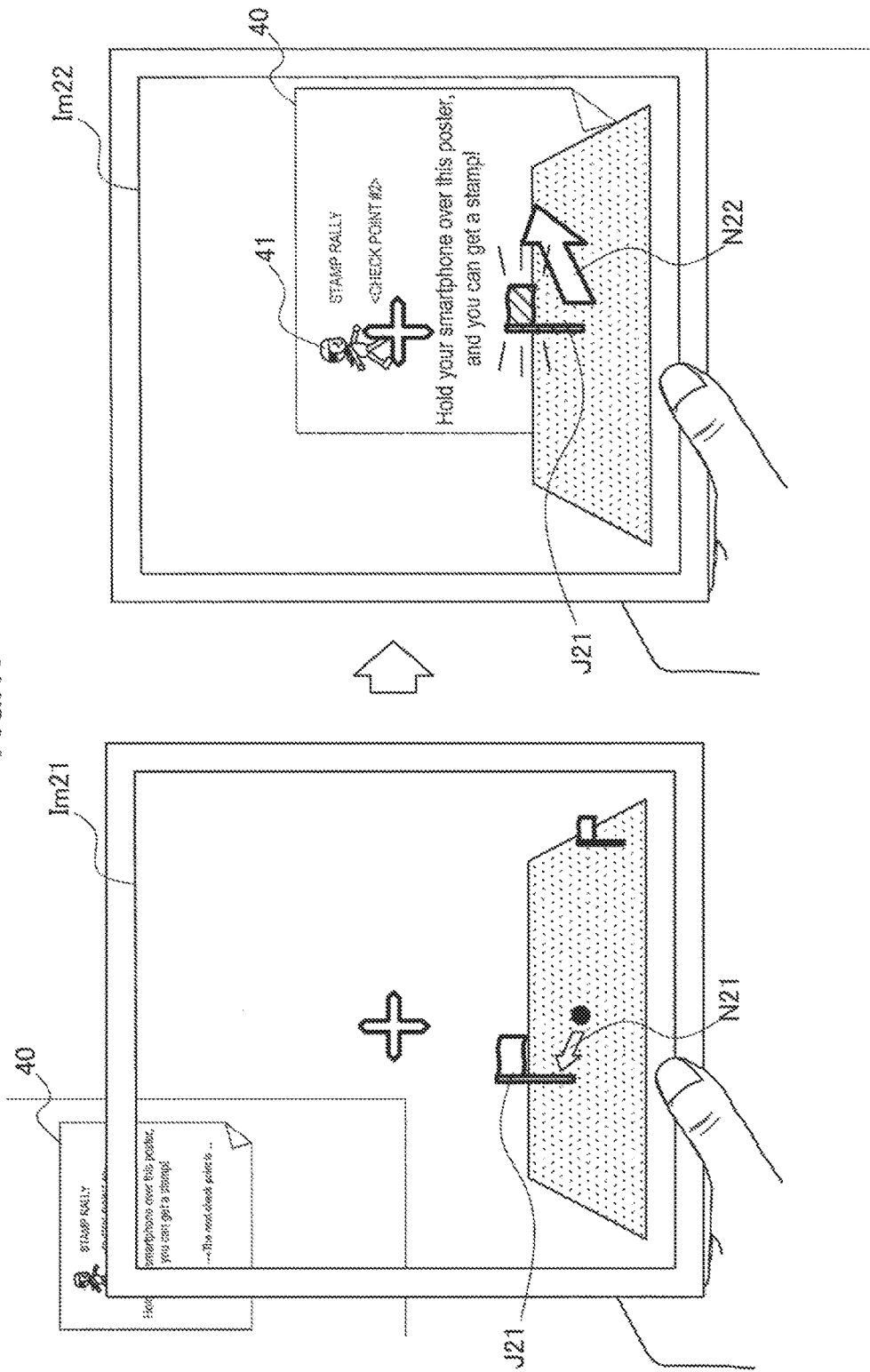

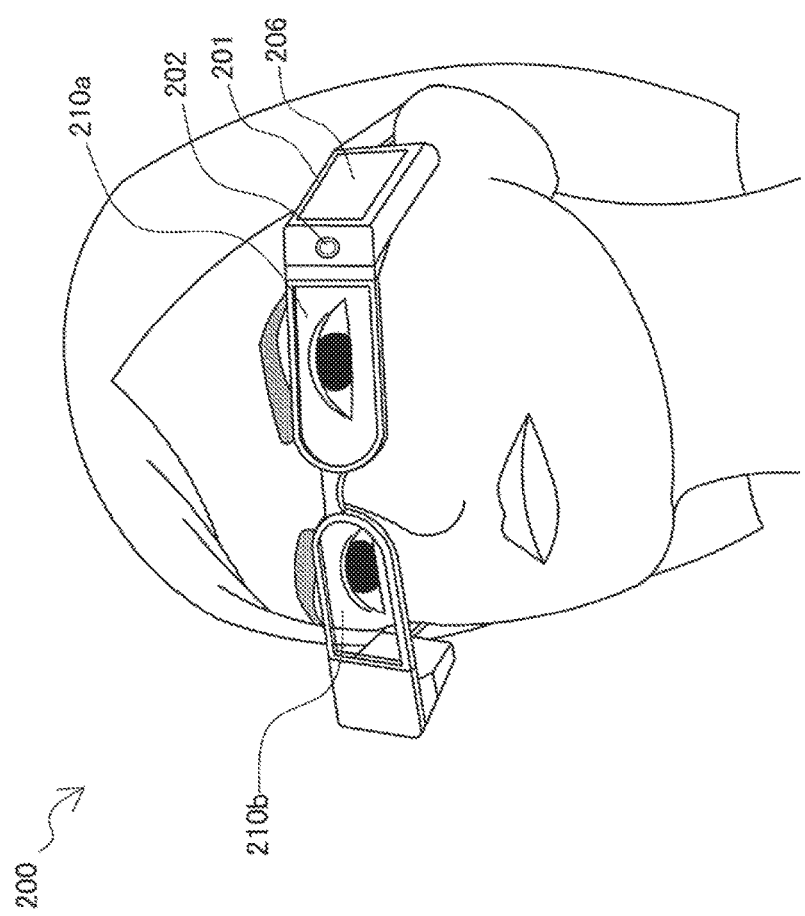

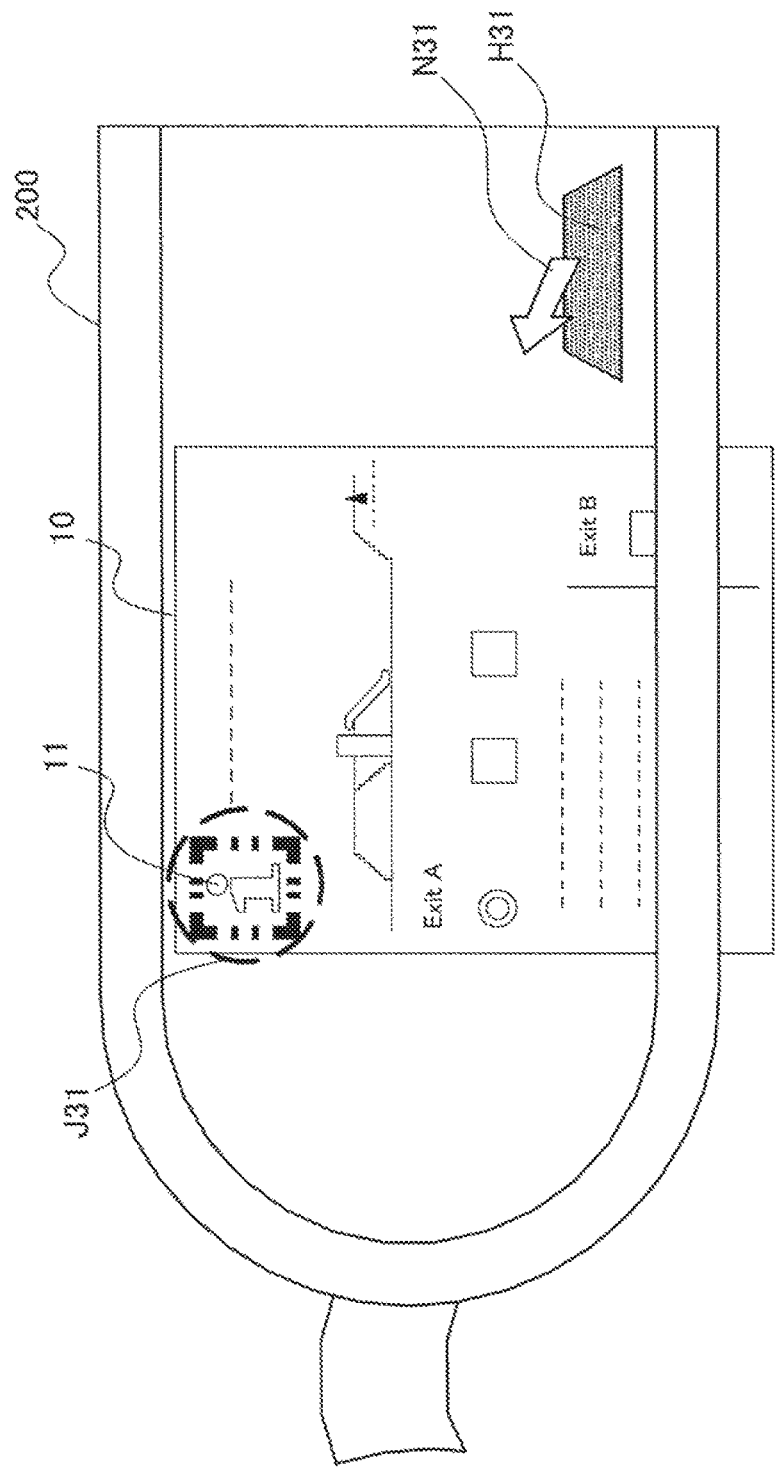

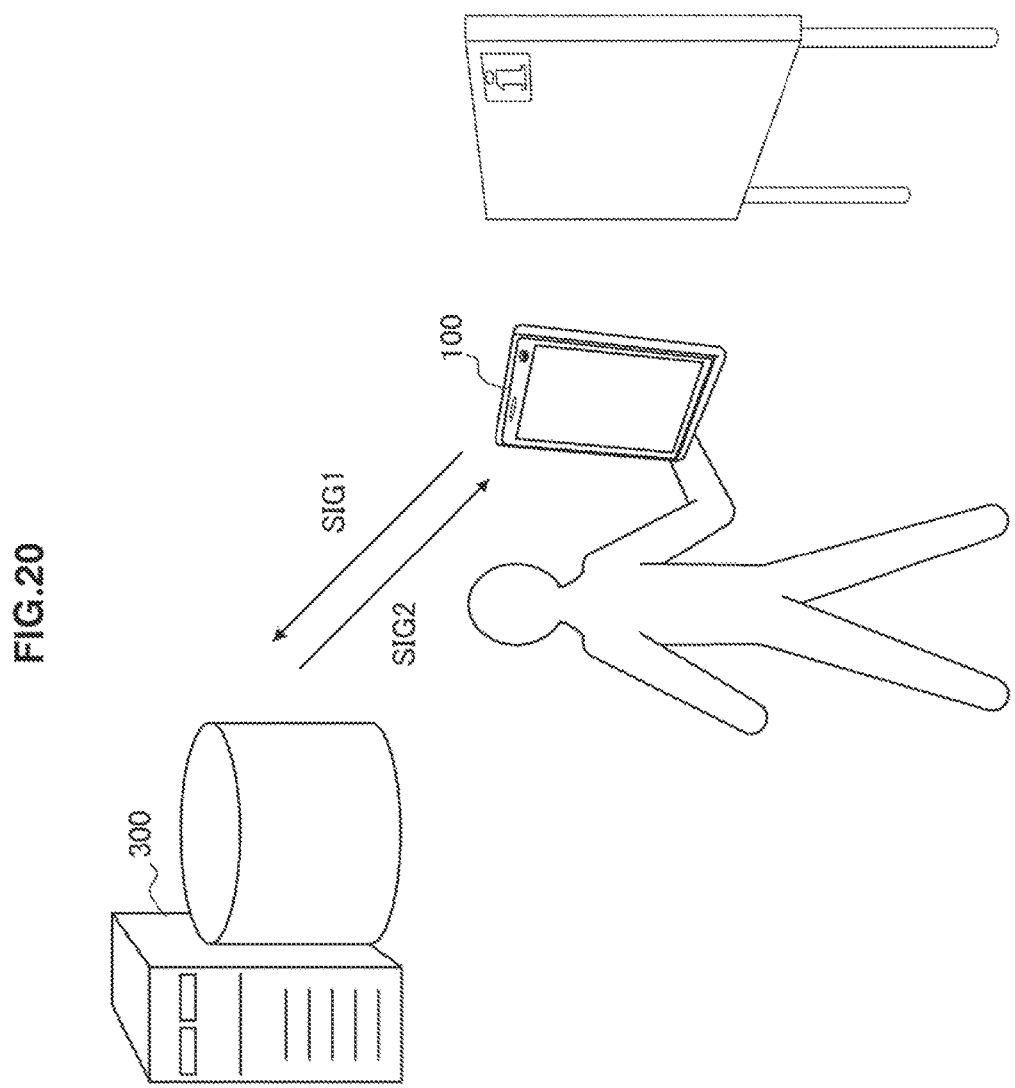

IMAGE PROCESSING DEVICE, IMAGE PROCESSING METHOD, AND PROGRAM

CROSS REFERENCE TO PRIOR APPLICATION

This application is a National Stage Patent Application of PCT International Patent Application No. PCT/JP2014/059809 (filed on Apr. 3, 2014) under 35 U.S.C. § 371, which claims priority to Japanese Patent Application No. 2013-126617 (filed on Jun. 17, 2013), which are all hereby incorporated by reference in their entirety.

TECHNICAL FIELD

The present disclosure relates to an image processing device, an image processing method, and a program.

BACKGROUND ART

Various navigation services for guiding a user to some destination have been implemented so far. Navigation is normally performed on the basis of knowledge regarding a position of a destination and a current position of the user. In order to acquire the current position of the user, many navigation services use a positioning module, such as a global positioning system (GPS) module or PlaceEngine (registered trademark), which is included in a terminal held by the user.

Patent Literature 1 proposes that a specified object corresponding to a place serving as a destination (e.g., buildings or facilities) be emphasized in an image so that a user can easily find the place serving as the destination on a screen of a terminal. Also in Patent Literature 1, a current position of the user is acquired via a GPS module.

CITATION LIST

Patent Literature

Patent Literature 1: JP 2012-079129A

SUMMARY OF INVENTION

Technical Problem

However, not all terminals include a positioning module. Further, even in the case where a terminal includes a positioning module, it is difficult to acquire a current position via the positioning module in an environment in which the terminal cannot receive a radio signal for positioning.

Therefore, it is desirable to achieve a mechanism capable of providing navigation to a destination to a user even in a state in which acquisition of a current position via a positioning module is difficult.

Solution to Problem

According to the present disclosure, there is provided an image processing device including: an image acquisition unit configured to acquire an image onto which a real object including a visual recognition target is projected; a recognition unit configured to recognize relative arrangement of a terminal that has captured the image to the real object by executing image recognition of the recognition target; and a control unit configured to display a display object indicating a direction toward a destination of a user on a screen of the terminal on the basis of the relative arrangement of the terminal recognized by the recognition unit.

According to the present disclosure, there is provided an image processing method executed by an image processing device, the image processing method including: acquiring an image onto which a real object including a visual recognition target is projected; recognizing relative arrangement of a terminal that has captured the image to the real object by executing image recognition of the recognition target; and displaying a display object indicating a direction toward a destination of a user on a screen of the terminal on the basis of the recognized relative arrangement of the terminal.

According to the present disclosure, there is provided a program causing a computer that controls an image processing device to function as: an image acquisition unit configured to acquire an image onto which a real object including a visual recognition target is projected; a recognition unit configured to recognize relative arrangement of a terminal that has captured the image to the real object by executing image recognition of the recognition target; and a control unit configured to display a display object indicating a direction toward a destination of a user on a screen of the terminal on the basis of the relative arrangement of the terminal recognized by the recognition unit.

Advantageous Effects of Invention

According to a technique of the present disclosure, it is possible to provide navigation to a destination to a user even in a state in which acquisition of a current position via a positioning module is difficult.

BRIEF DESCRIPTION OF DRAWINGS

FIG. 5 is a block diagram showing an example of a configuration of logical functions of an image processing device according to an embodiment.

FIG. 8A is an explanatory view illustrating a first example of a configuration of object arrangement data.

FIG. 8B is an explanatory view illustrating a second example of a configuration of object arrangement data.

FIG. 10 is an explanatory view illustrating how the output image exemplified in FIG. 9 appears to a user.

FIG. 11 is an explanatory view illustrating an example of tracking of arrangement of a terminal, the tracking being performed because of movement of the terminal.

FIG. 16A is a flowchart showing a first example of a detailed flow of destination direction determination processing shown in FIG. 14.

FIG. 16B is a flowchart showing a second example of a detailed flow of destination direction determination processing shown in FIG. 14.

FIG. 17 is an explanatory view illustrating some examples of display objects that can be displayed in an application example of a stamp rally.

FIG. 18 is an explanatory view illustrating a modification example of an image processing device.

FIG. 19 is an explanatory view illustrating some examples of display objects that can be displayed in the modification example of FIG. 18.

FIG. 20 is an explanatory view illustrating a link between a plurality of devices.

DESCRIPTION OF EMBODIMENTS

Figure 1:
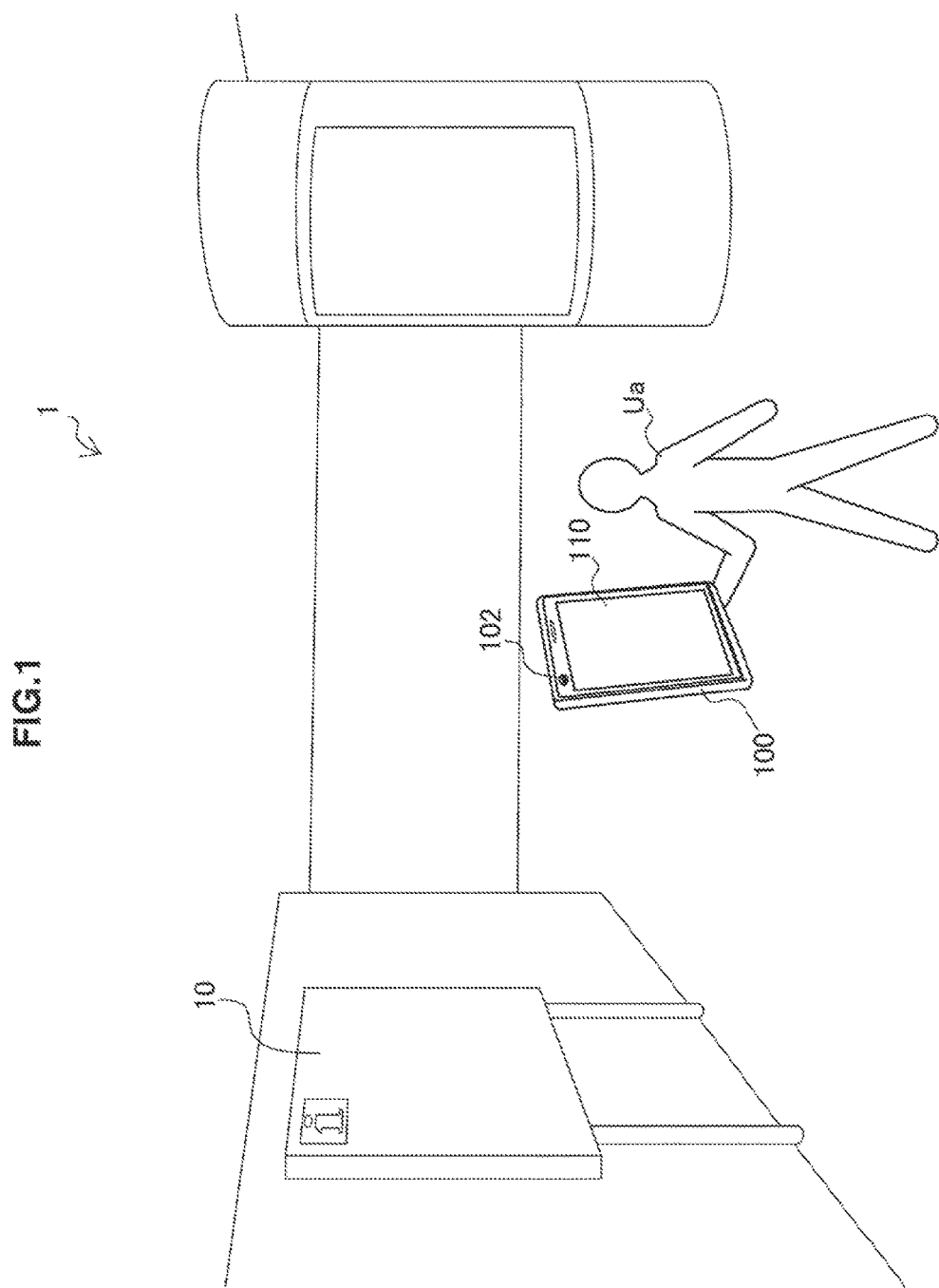
FIG. 1 is an explanatory view illustrating outline of a device according to an embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, description will be provided in the following order.

1. Outline
2. Configuration example of image processing device
2-1. Hardware configuration
2-2. Functional configuration
2-3. Flow of processing
3. Application examples
3-1. Stamp rally
3-2. Use of HMD
3-3. Link between a plurality of devices
4. Conclusion

<1. OUTLINE>

Outline of a device according to the present disclosure will be described with reference to FIG. 1 to FIG. 3.

FIG. 1 is an explanatory view illustrating outline of a device according to an embodiment. FIG. 1 illustrates an image processing device 100 that a user Ua brings. The image processing device 100 includes a camera 102 for capturing an image of a real space 1 and a display 110. In the example of FIG. 1, a real object 10 exists in the real space 1. The camera 102 of the image processing device 100 generates a series of images forming a video onto which the real object 10 is projected by capturing an image of the real object 10. Then, the image processing device 100 performs image processing with respect to the captured image generated by the camera 102 as an input image and generates an output image. In this embodiment, the output image is typically generated by superimposing a navigation display object on the input image. The display 110 of the image processing device 100 sequentially displays generated output images. Note that the real space 1 illustrated in FIG. 1 is merely an example. The image processing device 100 may process an image onto which any real object is projected.

In FIG. 1, a smartphone is illustrated as an example of the image processing device 100. However, the image processing device 100 is not limited to the example. The image processing device 100 may be a mobile device such as a tablet personal computer (PC), a notebook PC, a portable game terminal, a portable navigation device (PND), or a digital camera. Alternatively, the image processing device 100 may be a wearable device such as a head mounted display (HMD) terminal.

In a technique according to the present disclosure, an image onto which a visual recognition target of a real object is projected is acquired as an input image. The recognition target herein may be a known figure, mark, character string, or design existing in external appearance of the real object, or an arbitrary combination thereof. The recognition target may include a visual code (e.g., barcode or CyberCode (registered trademark)) in which some information is encoded. The image processing device 100 stores feature data of the recognition target in advance and recognizes arrangement (arrangement relative to image pickup surface) of the recognition target projected onto the input image with the use of the feature data. In this specification, the term "arrangement" includes at least one of a position (parallel movement), a posture (rotation), and a size (scaling) in a two-dimensional or three-dimensional coordinate system. The feature data may include, for example, data of a set of feature points extracted from a known image of the recognition target. Further, the feature data may include data of a shape and a size of a known figure pattern.

Figure 2:
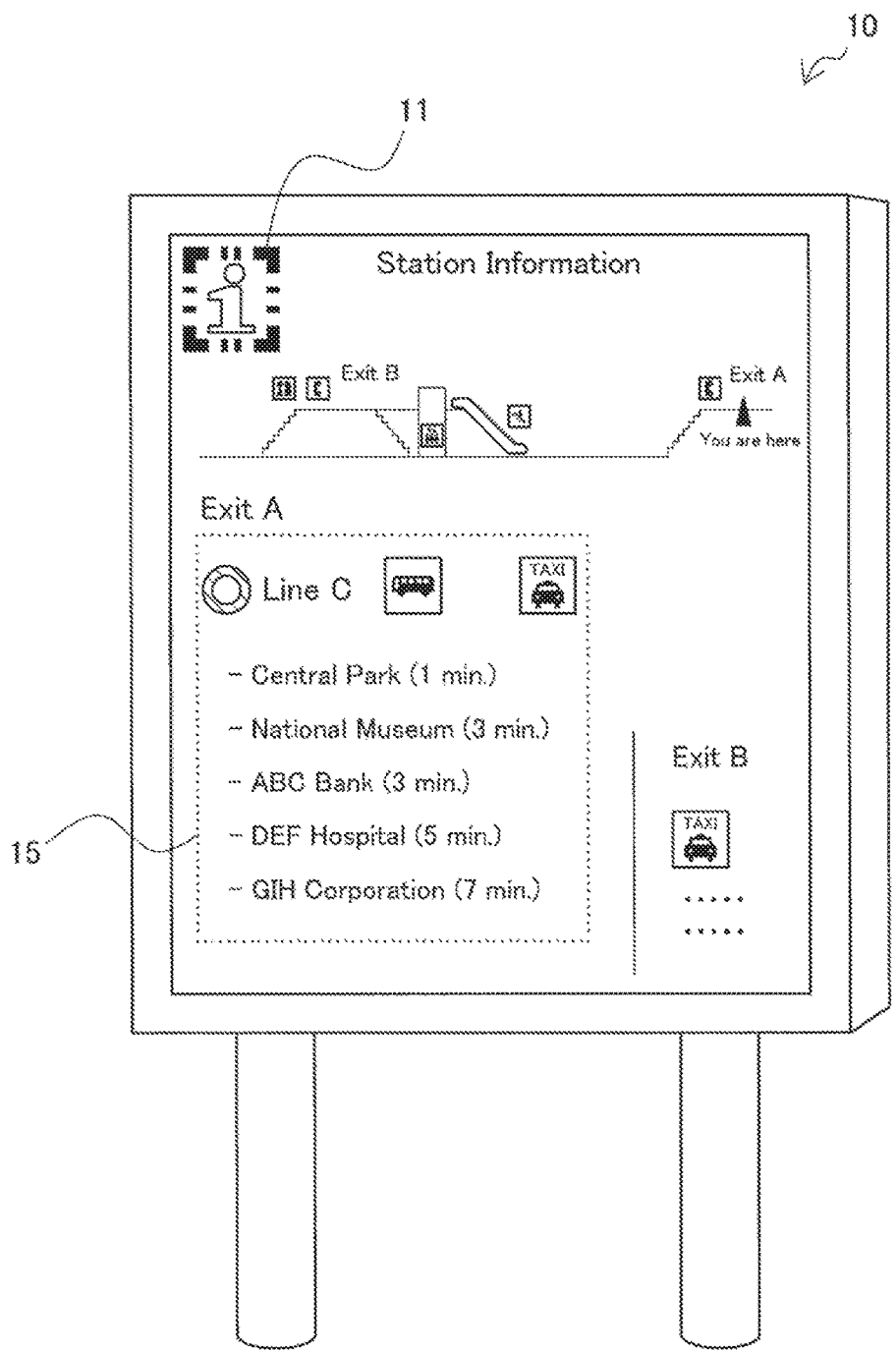
FIG. 2 is an explanatory view illustrating an example of a real object including a recognition target.

FIG. 2 is an explanatory view illustrating an example of the real object including the recognition target. In the example of FIG. 2, the real object 10 is a direction board placed in public facilities such as a station. The direction board 10 includes a recognition target 11 that can be printed on or attached to a surface thereof. The recognition target 11 has a figure resembling an alphabet "i" and a black-and-white frame surrounding the figure. The image processing device 100 can recognize how the recognition target 11 is arranged in an input image by, for example, matching a plurality of feature points extracted from the input image with a set of feature points of the recognition target 11 stored in advance.

The direction board 10 includes a destination list 15 on the surface thereof. By reading the destination list 15, a user can know main spots existing in the vicinity of a place where the direction board 10 is placed. However, the destination list 15 does not indicate a direction in which each spot exists. Even if the direction board 10 has a map and a position of each spot is shown on the map, it is difficult to intuitively express a direction toward a destination on a two-dimensional map (which is vertically posted in most cases). Therefore, the user is forced to perform mapping of a direction on the map and a direction in the real space in his/her head. In order to solve such inconvenience, some navigation services acquire a current position of a terminal via a positioning module included in the terminal, such as a GPS module and acquire a posture of the terminal via a sensor, thereby guiding a user to a destination. However, not all terminals include a positioning module. Further, even in the case where a terminal includes a positioning module, it is difficult to acquire a current position via the positioning module in an environment in which the terminal cannot receive a radio signal for positioning (e.g., the interior of a building, an underground space, or the inside of a tunnel). Meanwhile, in this embodiment, arrangement of the terminal is determined on the basis of the above-mentioned image recognition executed with respect to the recognition target 11, and navigation for guiding a user to a destination in accordance with a determination result thereof is provided. Therefore, there is no need to depend on the positioning module.

Figure 3:
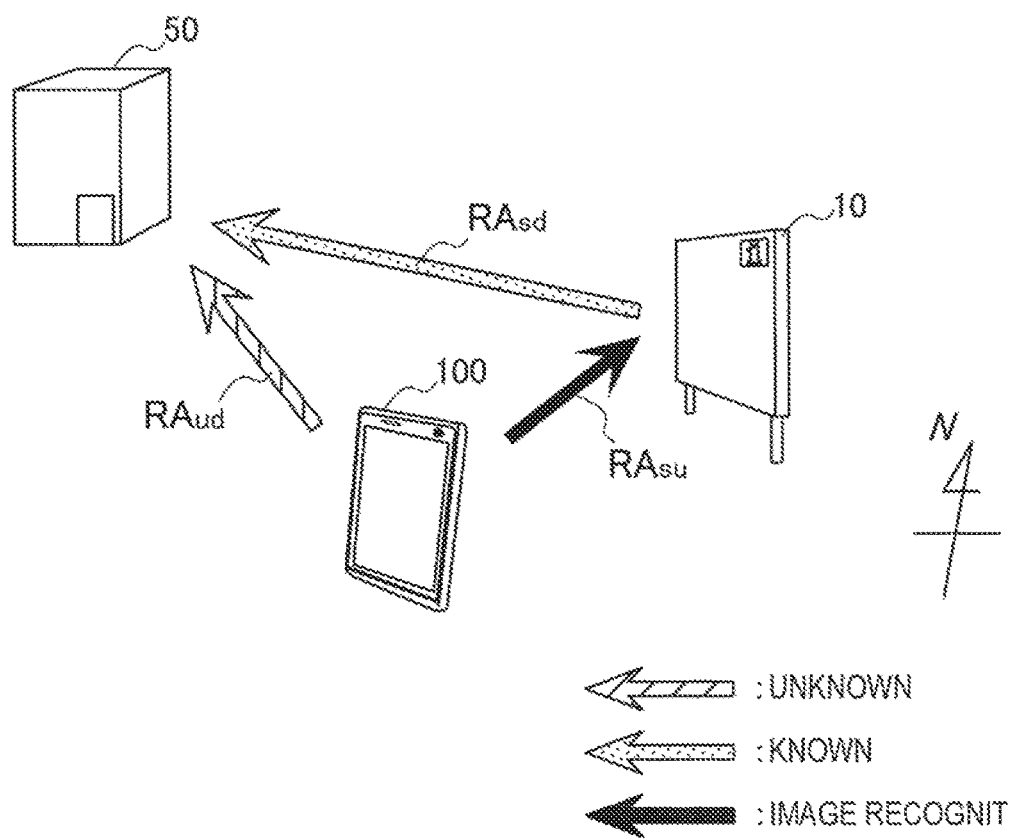
FIG. 3 is an explanatory view illustrating a principle of navigation in an embodiment.

FIG. 3 is an explanatory view illustrating a principle of navigation in an embodiment. FIG. 3 illustrates the real object 10 including the recognition target, a selected destination 50, and the image processing device 100 for capturing an image of the real object 10. Because the real object 10 and the destination 50 are geographically fixed, a relative position $RA_{sd}$ of the destination 50 to the real object 10 is known. Note that a posture and a size of the destination 50 do not influence navigation, and therefore the term "position" is used herein instead of "arrangement". A relative arrangement $RA_{su}$ of the image processing device 100 to the real object 10 is determined on the basis of image recognition of the recognition target that the real object includes. Then, a relative position $RA_{ud}$ of the destination 50 to the image processing device 100, which has been unknown, is obtained with the use of the relative arrangement $RA_{su}$ of the image processing device 100 to the real object 10 and the relative position $RA_{sd}$ of the destination 50 to the real object 10. The image processing device 100 can display, for example, a navigation display object corresponding to the relative position $RA_{ud}$ on a screen thereof.

Note that the real object is not limited to the examples of FIG. 2 and FIG. 3 and any real object existing in the real space may include a recognition target. For example, a recognition target may be printed on or attached to a floor map of a commercial building, an advertising board, a poster for an event, or the like, or a recognition target may be electronically displayed by digital signage. In the next section, there will be described an example of a specific configuration of the image processing device 100 for achieving the above-mentioned mechanism.

>2. CONFIGURATION EXAMPLE OF IMAGE PROCESSING DEVICE>

[2-1. Hardware Configuration]

Figure 4:
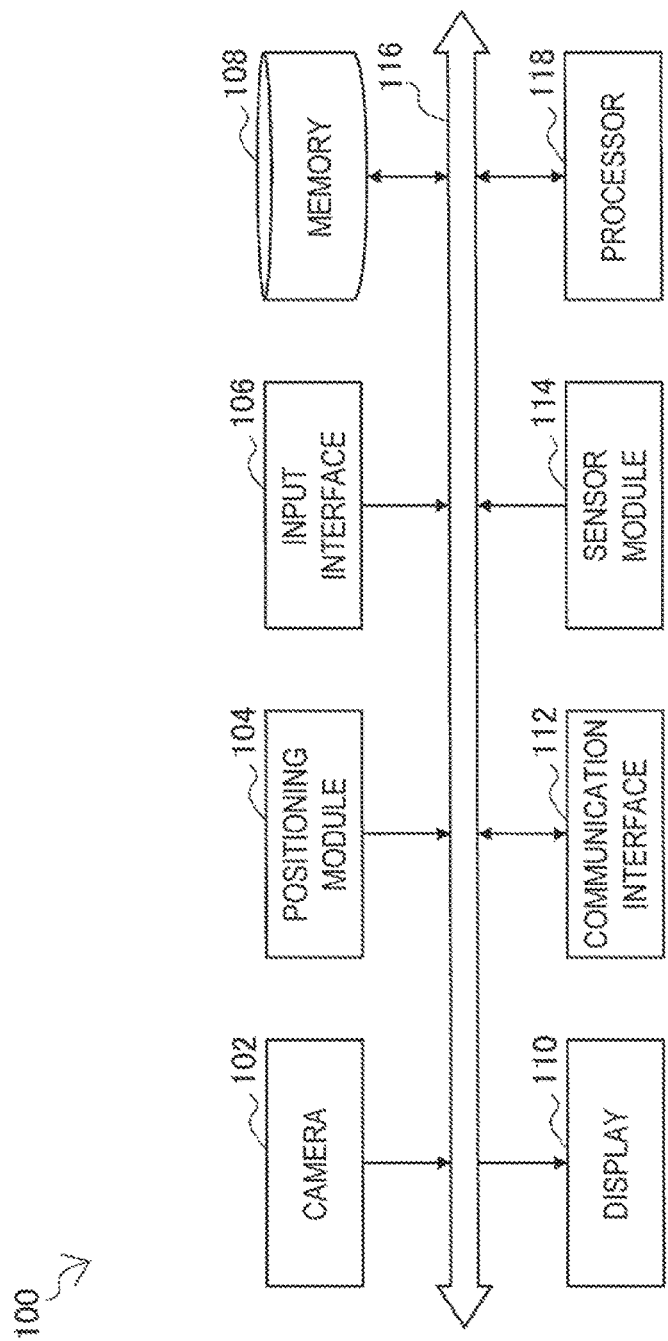
FIG. 4 is a block diagram showing an example of a hardware configuration of an image processing device according to an embodiment.

FIG. 4 is a block diagram showing an example of a hardware configuration of the image processing device 100 according to an embodiment. When referring to FIG. 4, the image processing device 100 includes the camera 102, a positioning module 104, an input interface 106, a memory 108, the display 110, a communication interface 112, a sensor module 114, a bus 116, and a processor 118.

(1) Camera

The camera 102 is an image pickup module for capturing an image. The camera 102 captures an image of a real object with the use of an image pickup element such as a charge coupled device (CCD) or a complementary metal oxide semiconductor (CMOS) and generates a captured image. A series of captured images generated by the camera 102 forms a video.

(2) Positioning Module

The positioning module 104 may be a global positioning system (GPS) module, PlaceEngine (registered trademark), or the like. The positioning module 104 receives a radio signal for positioning in an environment in which the positioning module can receive the radio signal, thereby acquiring a geographical position of the image processing device 100. Then, the positioning module 104 generates positioning data indicating the acquired geographical position. In this specification, the geographical position means an absolute position in a global coordinate system. Note that the positioning module 104 may be omitted from the configuration of the image processing device 100.

(3) Input Interface

The input interface 106 is an input device used for allowing a user to operate the image processing device 100 or to input information to the image processing device 100. The input interface 106 may include, for example, a touch sensor for detecting touch by the user on a screen of the display 110. The input interface 106 may also include an input device such as a keyboard, a keypad, a button, or a switch. The input interface 106 may also include a microphone for voice input and a voice recognition module.

(4) Memory

The memory 108 is a storage medium such as a semiconductor memory or a hard disk. The memory 108 stores a program and data for processing using the image processing device 100. The data stored by the memory 108 can encompass, for example, captured image data, positioning data, sensor data, and data in various databases (DBs) described below Note that the program and the data described in this specification may be partially acquired from an external data source (e.g., data server, network storage, or external memory), instead of being stored in the memory 108.

(5) Display

The display 110 is a display module including a screen for displaying an image. The display 110 may be, for example, a liquid crystal display (LCD), an organic light-emitting diode (OLED), or a cathode ray tube (CRT). The display 110 displays, for example, an output image on which a navigation display object is superimposed, the output image being generated by the image processing device 100.

(6) Communication Interface

The communication interface 112 is a communication interface for mediating communication between the image processing device 100 and another device. The communication interface 112 supports an arbitrary wireless communication protocol or wired communication protocol and establishes communication connection with another device.

(7) Sensor Module

The sensor module 114 can include a sensor group including a gyro sensor, a geomagnetic sensor, an acceleration sensor, and the like. The sensor module 114 measures, for example, a posture of the image processing device 100. The sensor module 114 also measures movement of the image processing device 100. Then, the sensor module 114 generates sensor data indicating the measured posture and movement. The sensor data generated by the sensor module 114 can be used for tracking a change in arrangement of the image processing device 100. Note that the sensor module 114 may be omitted from the configuration of the image processing device 100.

(8) Bus

The bus 116 connects the camera 102, the positioning module 104, the input interface 106, the memory 108, the display 110, the communication interface 112, the sensor module 114, and the processor 118 to one another.

(9) Processor

The processor 118 corresponds to a processor such as a central processing unit (CPU) or a digital signal processor (DSP). The processor 118 executes a program stored in the memory 108 or another storage medium, thereby operating various functions of the image processing device 100 described below.

[2-2. Functional Configuration]

FIG. 5 is a block diagram showing an example of a configuration of logical functions achieved by the memory 108 and the processor 118 of the image processing device 100 shown in FIG. 4. When referring to FIG. 5, the image processing device 100 includes an image acquisition unit 140, a recognition database (DB) 150, a recognition unit 160, an object arrangement DB 170, and a control unit 180.

(1) Image Acquisition Unit

The image acquisition unit 140 acquires, as an input image, an image captured by the camera 102. The input image is typically each frame of a series of frames forming a moving image. In this embodiment, the input image is an image onto which a real object including a visual recognition target is projected. Then, the image acquisition unit 140 outputs the acquired input image to the recognition unit 160 and the control unit 180.

(2) Recognition DB

The recognition DB 150 is a database for storing recognition dictionary data used by the recognition unit 160 described below. The recognition dictionary data includes feature data defining a feature of each of one or more recognition targets. In a certain example, the recognition dictionary data can include additional code arrangement data defining arrangement of an additional code that the real object additionally includes.

Figure 6A:
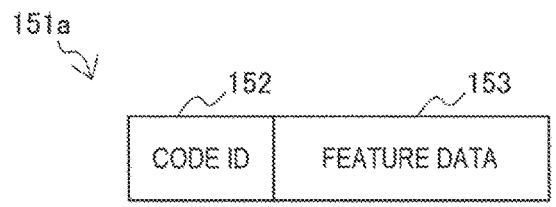
FIG. 6A is an explanatory view illustrating a first example of a configuration of recognition dictionary data.

FIG. 6A is an explanatory view illustrating a first example of a configuration of the recognition dictionary data that can be stored by the recognition DB 150. When referring to FIG. 6A, recognition dictionary data 151a includes a code ID 152 and feature data 153. The code ID 152 is an identifier for uniquely identifying a recognition target. The feature data 153 defines a known feature of each recognition target. The feature data 153 may define a set of feature values extracted from a known image of the recognition target in advance. As an example, the set of the feature values may include position coordinates of a plurality of feature points in a local coordinate system of the real object and brightness of each feature point. The feature data 153 may also define a shape and a size of a known pattern.

Figure 6B:
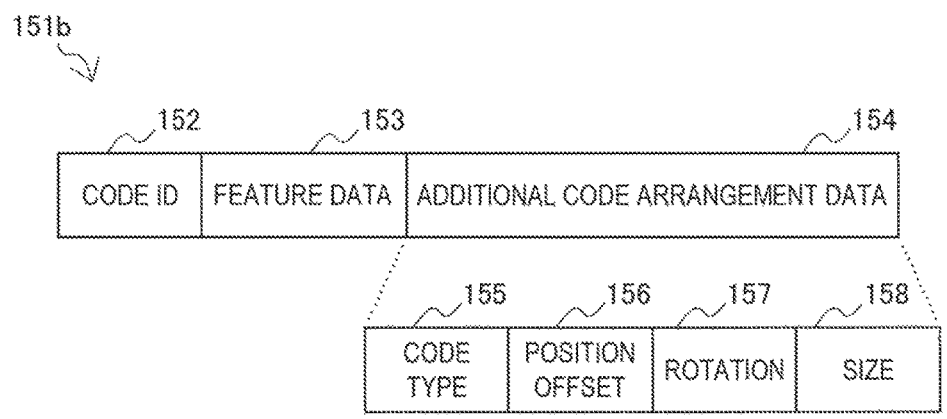
FIG. 6B is an explanatory view illustrating a second example of a configuration of recognition dictionary data.

FIG. 6B is an explanatory view illustrating a second example of the configuration of the recognition dictionary data that can be stored by the recognition DB 150. When referring to FIG. 6B, recognition dictionary data 151b includes the code ID 152, the feature data 153, and additional code arrangement data 154. The additional code arrangement data 154 includes a code type 155, a position offset 156, rotation 157, and a size 158. The code type 155 defines a type of an additional code (e.g., barcode or CyberCode (registered trademark)). The position offset 156 defines offset of a reference position of the additional code from a reference position of the recognition target (e.g., an origin in the local coordinate system). The rotation 157 defines a rotation amount of the additional code (e.g., a rotation amount of the real object on the surface) around the reference position. The size 158 defines a size of the additional code.

Figure 7:
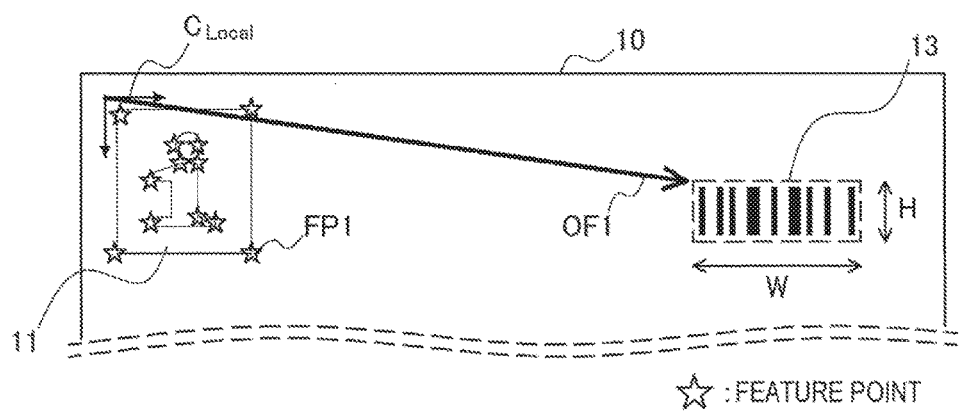
FIG. 7 is an explanatory view illustrating additional code arrangement data exemplified in FIG. 6B.

FIG. 7 is an explanatory view illustrating the additional code arrangement data 154 exemplified in FIG. 6B. In FIG. 7, star marks indicate positions of a plurality of feature points of the recognition target 11, such as a feature point FP1, in a local coordinate system $C_{Local}$. A position coordinate OF1 is a vector value defined by the position offset 156 and is equal to a coordinate of an upper left vertex of a bounding box surrounding the additional code in the local coordinate system $C_{Local}$. The additional code is not rotated in the example of FIG. 7, and therefore the rotation 157 can define a rotation amount of zero. A width W and a height H of the bounding box surrounding the additional code can be defined by the size 158.

(3) Recognition Unit

The recognition unit 160 recognizes relative arrangement of the terminal that has captured an input image to the real object including the recognition target by executing image recognition of the recognition target. In this embodiment, the terminal that has captured the input image is the image processing device 100. The recognition unit 160 may, for example, recognize the recognition target projected onto the input image by matching an image feature value extracted from the input image with a set of known feature values stored by the recognition DB 150. The recognition unit 160 may also recognize the recognition target projected onto the input image by matching a pattern included in the input image with a known pattern stored by the recognition DB 150. Further, the recognition unit 160 recognizes how the recognition target is arranged in the input image on the basis of a positional relationship between a plurality of detected feature points or a shape and a size of the detected pattern.

As a result of the image recognition, the recognition unit 160 generates a parameter expressing relative arrangement of the recognition target to an image pickup surface. As an example, the parameter generated by the recognition unit 160 may be a homogeneous transformation matrix in a three-dimensional screen coordinate system corresponding to the image pickup surface and a depth thereof. The homogeneous transformation matrix practically expresses the relative arrangement of the image processing device 100 to the real object. The recognition unit 160 outputs, to the control unit 180, an identifier (code ID) of the recognized recognition target and a corresponding parameter (e.g., homogeneous transformation matrix).

Further, in the case where information is encoded in the detected recognition target or the additional code added to a surface of the real object in association with the recognition target, the recognition unit 160 may decode the encoded information from the recognition target or the additional code. The information decoded by the recognition unit 160 may include identification information of the recognition target (or the real object) that can be used for a query to a data server. Further, the information decoded by the recognition unit 160 may include object arrangement data indicating at least one of geographical arrangement of the real object and a position of a destination as described below. In the case where the information is encoded in the additional code, the recognition unit 160 specifies a region where the additional code exists in accordance with the additional code arrangement data 154 exemplified in FIG. 6B. Then, the recognition unit 160 executes recognition processing corresponding to a code type of the additional code (e.g., reading of a barcode) with respect to a partial image of the specified region. As a result, it is possible to decode the information encoded by the additional code. Note that the object arrangement data may be acquired from an external data server with the use of the identification information of the real object, instead of being decoded from the recognition target or the additional code.

(4) Object Arrangement DB

The object arrangement DB 170 is a database for storing object arrangement data. The object arrangement data can be used for determining a direction toward a destination by the control unit 180 described below.

FIG. 8A is an explanatory view illustrating a first example of a configuration of the object arrangement data. When referring to FIG. 8A, object arrangement data 171*a* includes an object ID 172*a*, a type 173, a name 174, a geographical position 175, and a posture 176. The object ID 172*a* is an identifier for identifying each candidate for the real object including the recognition target and for the destination. The type 173 identifies which kind of object each object is (e.g., a candidate for a direction board or destination). The name 174 defines a display name of each object. The geographical position 175 defines a position (e.g., latitude, longitude, and altitude) of each object in the global coordinate system. The posture 176 defines a posture of each object in the global coordinate system. Note that, regarding the candidates for the destination, values of the posture 176 may be omitted.

FIG. 8B is an explanatory view illustrating a second example of the configuration of the object arrangement data. When referring to FIG. 8B, object arrangement data 171*b* includes a code ID 172*b*, the name 174, a destination ID 177, a destination name 178, and relative arrangement 179. The code ID 172*b* is an identifier for identifying each real object including a recognition target (or each recognition target). The destination ID 177 is an identifier for identifying each candidate for the destination. In the example of FIG. 8B, one or more candidates for the destination are associated with a single recognition target. The destination name 178 defines a display name of each candidate for the destination. The relative arrangement 179 defines relative arrangement of each candidate for the destination to an associated real object. The relative arrangement 179 may be strictly defined with the use of a coordinate value or may be roughly defined with the use of simple division values such as east, south, west, north, up, and down.

The above-mentioned object arrangement data may be stored by the object arrangement DB 170 in advance. Further, a part of all of the object arrangement data may be dynamically acquired from an external data server. Further, as described above, the part or all of the object arrangement data may be decoded by the recognition unit 160 from the recognition target or the additional code associated with the recognition target.

(5) Control Unit

The control unit 180 displays a display object indicating a direction toward a destination of the user on the screen of the display 110 on the basis of the relative arrangement of the image processing device 100 to the real object, the relative arrangement being recognized by the recognition unit 160.

The control unit 180 may determine, for example, the direction toward the destination on the basis of the relative arrangement of the terminal, which is recognized by the recognition unit 160, and the geographical arrangement of the real object and the geographical position of the destination, which are indicated by the object arrangement data. More specifically, for example, the control unit 180 determines geographical arrangement of the terminal on the basis of the geographical arrangement (e.g., latitude, longitude, altitude, and direction) of the real object and the relative arrangement of the terminal to the real object. Further, in the case where the geographical position of the destination can be obtained, the control unit 180 can determine a vector corresponding to the direction toward the destination in the screen coordinate system of the terminal.

Instead of this, the control unit 180 may determine the direction toward the destination on the basis of the relative arrangement of the terminal recognized by the recognition unit 160 and a relative position of the destination to the real object, the relative position being indicated by the object arrangement data. More specifically, for example, the control unit 180 can determine a vector corresponding to the direction toward the destination in the screen coordinate system of the terminal by adding the relative position of the destination to the real object to the relative arrangement of the real object to the terminal.

By dynamically determining the direction toward the destination on the basis of the image recognition as described above, it is possible to intuitively present the direction toward the destination to the user on the screen with the use of the display object.

Figure 9:
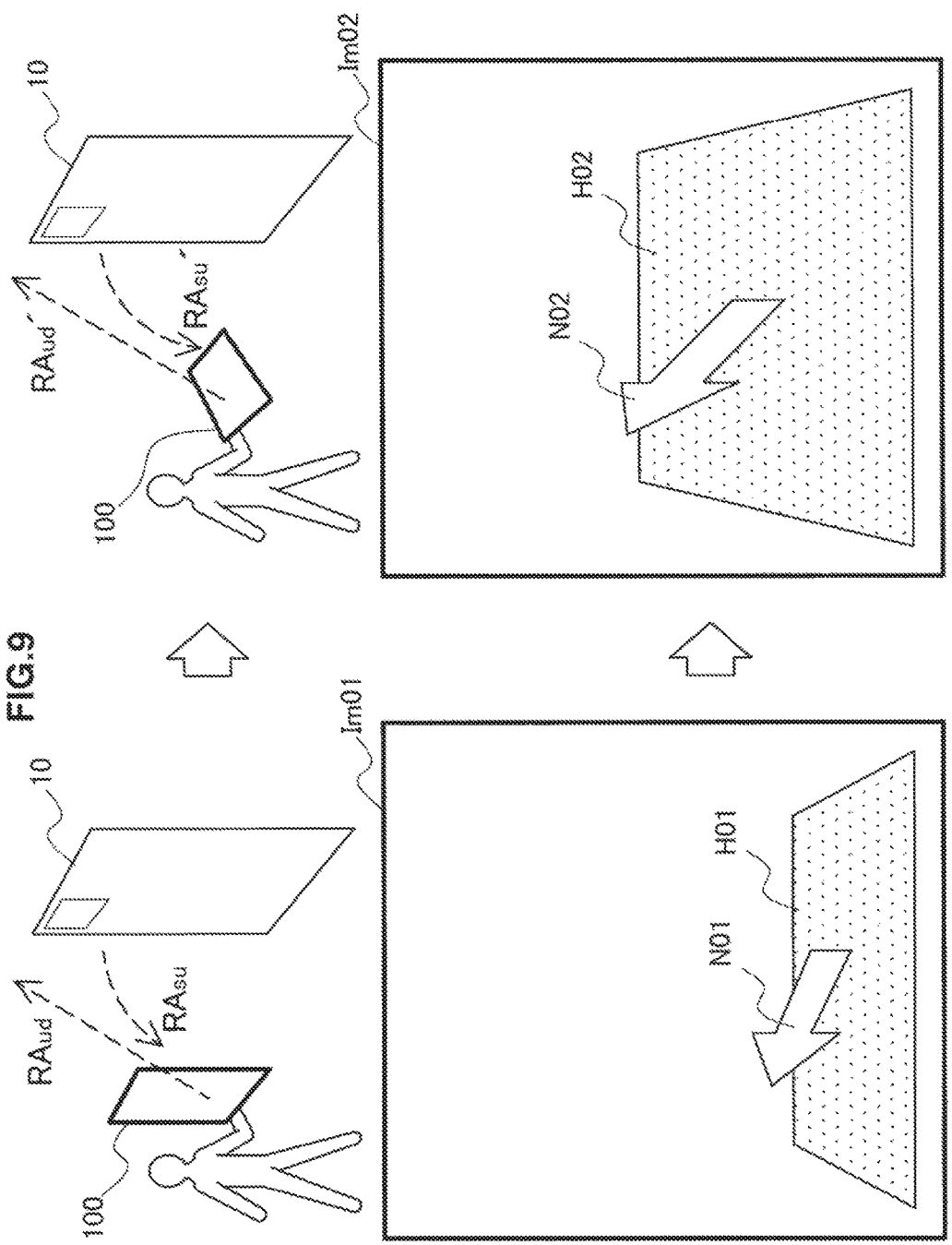
FIG. 9 is an explanatory view illustrating an example of a change in an output image depending on a change in a posture of a terminal.

FIG. 9 is an explanatory view illustrating an example of a change in an output image depending on a change in a posture of the terminal. An upper left part of FIG. 9 illustrates a positional relationship between the direction board 10 and the image processing device 100 at a certain point, and the image pickup surface of the image processing device 100 faces the direction board 10. The recognition unit 160 executes image recognition of the recognition target on the surface of the direction board 10 and generates the parameter $RA_{SU}$ expressing the relative arrangement of the image processing device 100 to the direction board 10. A lower left part of FIG. 9 illustrates an output image Im01 as an example. A navigation display object N01 indicating a direction toward a destination is superimposed on the output image Im01. The control unit 180 determines the direction $RA_{ud}$ of the display object N01 in accordance with the parameter $RA_{SU}$. A display object H01 expresses a horizontal surface to assist the user to grasp a three-dimensional direction of the display object N01. An upper right part of FIG. 9 illustrates the positional relationship between the direction board 10 and the image processing device 100 at some point thereafter, and the image processing device 100 is inclined so that the image pickup surface becomes more horizontal. A parameter $RA_{SU}'$ expresses the relative arrangement of the image processing device 100 to the direction board 10 at this point. A lower right part of FIG. 9 illustrates an output image Im02 as an example. A display object N02 having a direction $RA_{ud}'$ that is determined in accordance with the parameter $RA_{SU}'$ is superimposed on the output image Im02. A display object H02 expresses a horizontal surface.

FIG. 10 is an explanatory view illustrating how the output image exemplified in FIG. 9 appears to the user. In a left part of FIG. 10, the display object N01 superimposed on the output image Im01 indicates a left-forward direction seen from the user. In a right part of FIG. 10, the display object N02 superimposed on the output image Im02 still indicates the left-forward direction seen from the user, regardless of the change in the posture of the terminal. Therefore, the user can intuitively know the direction in which the destination exists in the real space even in the case where the terminal is moved.

After the recognition target that has been recognized once deviates from an angle of view, the control unit 180 may continuously display the navigation display object on the screen by tracking the relative arrangement of the terminal with the use of sensor data from the sensor module 114. For example, the control unit 180 can track a change in a position of the terminal by adding up acceleration of the terminal measured by the acceleration sensor. Further, the control unit 180 can track the change in the posture of the terminal by adding up rotation of the terminal measured by the gyro sensor. Furthermore, the control unit 180 can track the posture of the terminal with the use of sensor data from the geomagnetic sensor. Still further, in the case where the positioning module 104 is usable, the control unit 180 may correct arrangement of the tracked terminal with the use of positioning data from the positioning module.

FIG. 11 is an explanatory view illustrating an example of tracking of arrangement of the terminal, the tracking being performed because of movement of the terminal. FIG. 11 illustrates a state in which the user Ua bringing the image processing device 100 moves at times t=T11, T12, T13, and T14. At the time T11, the direction board 10 exists in an angle of view G11 of the image processing device 100, and therefore the control unit 180 can determine arrangement of the image processing device 100 on the basis of a result of image recognition executed by the recognition unit 160. At the time T12, the direction board 10 exists in an angle of view G12 of the image processing device 100 while the user Ua moves, and therefore the control unit 180 can still determine the arrangement of the image processing device 100 on the basis of the result of the image recognition. The user Ua further moves, and, as a result, at the time T13, the recognition target does not exist in an angle of view G13 of the image processing device 100. In this case, the control unit 180 continuously displays the navigation display object on the screen by tracking the arrangement of the image processing device 100 with the use of sensor data, thereby providing a navigation service to the user. However, accuracy of tracking using the sensor data can be reduced as a duration time thereof becomes long. The user Ua moves from the interior of a building to the outside thereof, and, as a result, at the time T14, the positioning module 104 becomes usable. Then, the control unit 180 corrects the arrangement of the tracked image processing device 100 by acquiring a geographical position of the image processing device 100 via the positioning module 104. The posture of the image processing device 100 may also be corrected with the use of the sensor data. Such tracking and correction make it possible to provide a continuous navigation service and reinforce usability for the user.

The control unit 180 may allow the user to select a destination to be navigated by displaying, on the screen, a list or map of destination candidates associated with a recognized real object. Instead of this, the control unit 180 may allow the user to select a destination to be navigated in advance. Further, in the case where a single destination is not selected by the user, the control unit 180 may display, on the screen, a plurality of display objects indicating respective directions toward the plurality of destination candidates associated with the recognized real object.

Figure 12A:
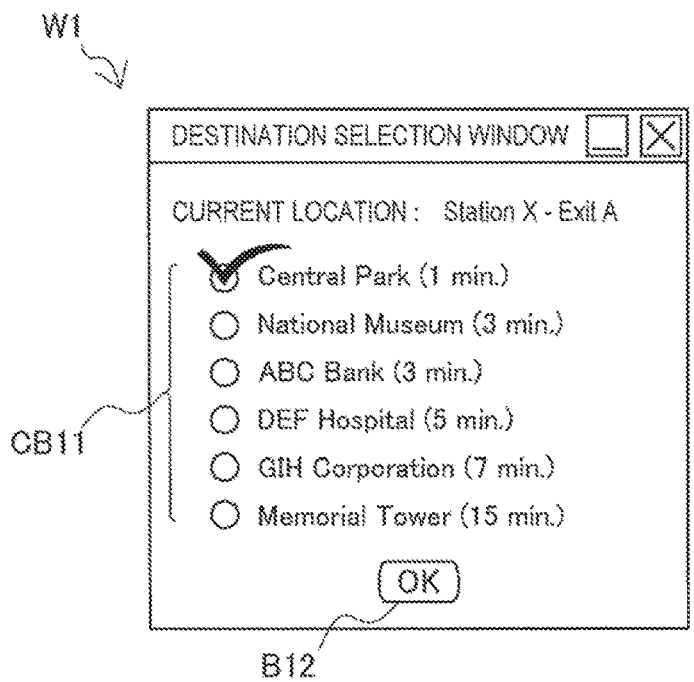
FIG. 12A is an explanatory view illustrating a first example of a window for allowing a user to select a destination.
Figure 12B:
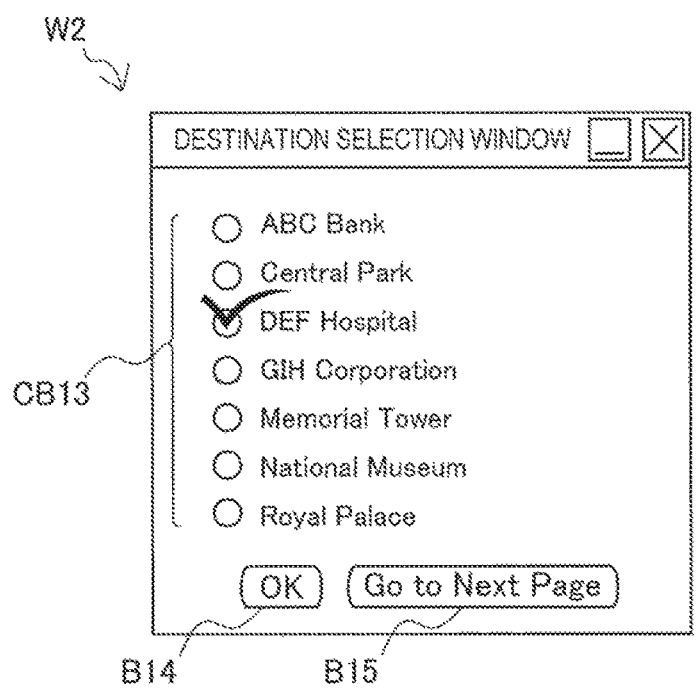
FIG. 12B is an explanatory view illustrating a second example of a window for allowing a user to select a destination.
Figure 12C:
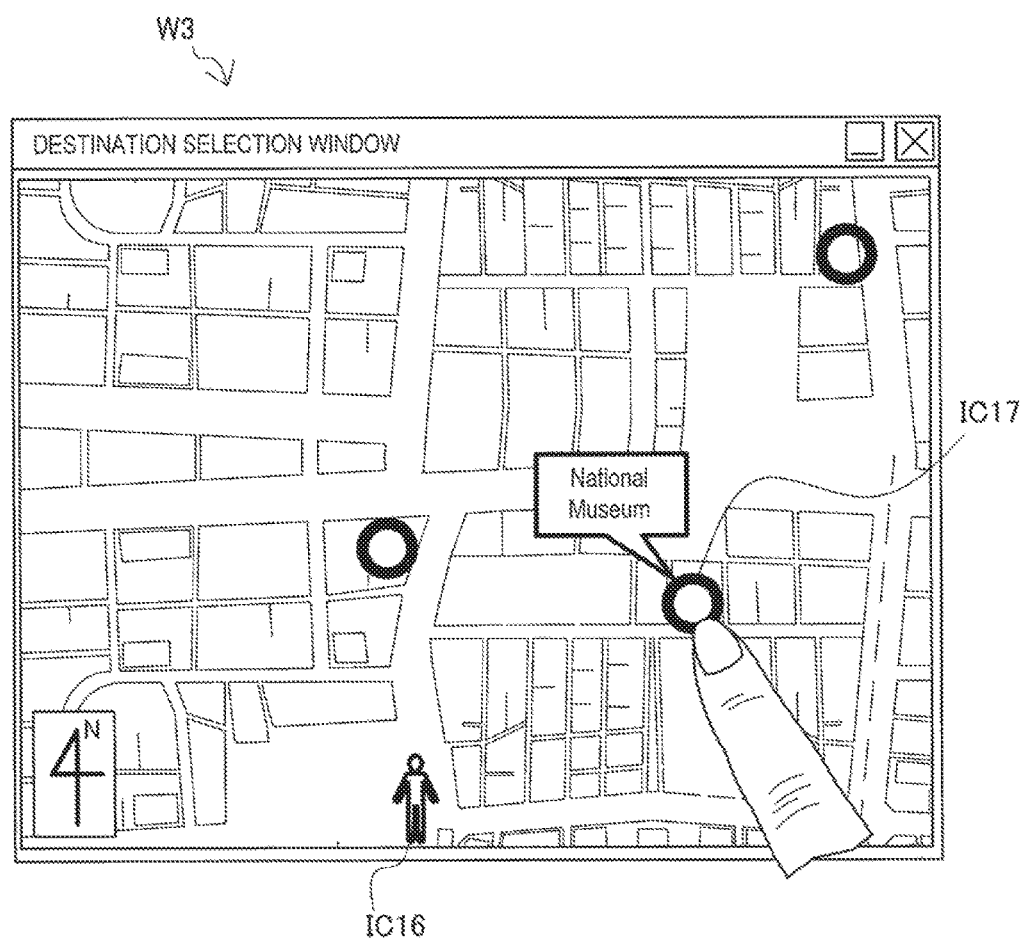
FIG. 12C is an explanatory view illustrating a third example of a window for allowing a user to select a destination.

FIG. 12A to FIG. 12C illustrate respective examples of a window for allowing a user to select a destination. In a first example illustrated in FIG. 12A, a destination selection window W1 includes checkboxes CB11 and a button B12. The checkboxes CB11 illustrate a list of destination candidates (existing, for example, in the vicinity of a place where a direction board is placed) associated with a real object recognized by the recognition unit 160. The user checks any one of the candidates in the checkbox CB11 and taps the button B12. Thus, a destination to be navigated is selected.

In a second example illustrated in FIG. 12B, a destination selection window W2 includes checkboxes CB13, a button B14, and a button B15. The checkboxes CB13 illustrate a list of some of all destination candidates. The user may select a desired destination by checking any one of the candidates in the checkboxes CB13 and then tapping the button B14. Instead of this, the user may go to the next page by tapping the button B15 so as to cause the destination selection window W2 to display some other destination candidates in the list. Note that, in the destination selection window W2, the destination candidates may be grouped for, for example, each nearest station, and destination candidates to be listed may be filtered by selecting the nearest station.

In a third example illustrated in FIG. 12C, a destination selection window W3 includes a map in the vicinity of a geographical position of a real object recognized by the recognition unit 160 and a plurality of icons plotted on the map. An icon IC 16 indicates a current location (i.e., the geographical position of the recognized real object). An icon IC 17 indicates one of positions of destination candidates. The user can select a destination to be navigated by tapping an icon corresponding to a desired destination.

An output image for navigation can include various display objects for improving usability. FIG. 13A to FIG. 13D illustrate some examples of display objects that can be displayed in an embodiment.

Figure 13A:
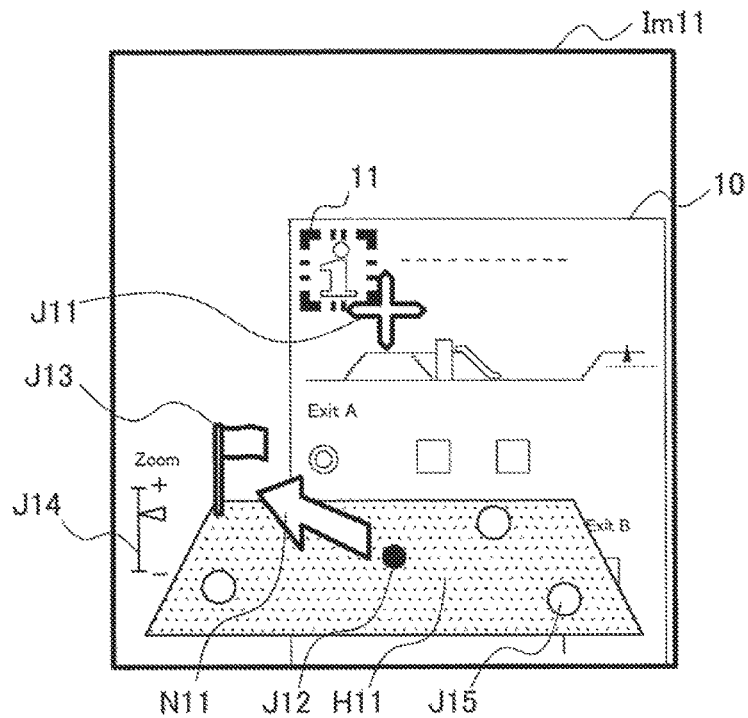
FIG. 13A is a first explanatory view illustrating some examples of display objects that can be displayed in an embodiment.

In a first example of FIG. 13A, display objects N11 and H11 and auxiliary display objects J11, J12, J13, J14, and J15 are superimposed on an output image Im11. The display object N11 indicates a direction toward a destination from a current location. The display object H11 is an object expressing a horizontal surface. The auxiliary display object J11 is an object expressing a sight of image recognition. The auxiliary display object J12 is an icon expressing the current location. The auxiliary display object J13 is an icon expressing the destination. The auxiliary display object J14 is a slider for allowing a user to change a scale for displaying the current location, the destination, and other places. The auxiliary display object J15 is an icon expressing a spot other than the destination (e.g., a direction board or a destination candidate that is not selected).

Figure 13B:
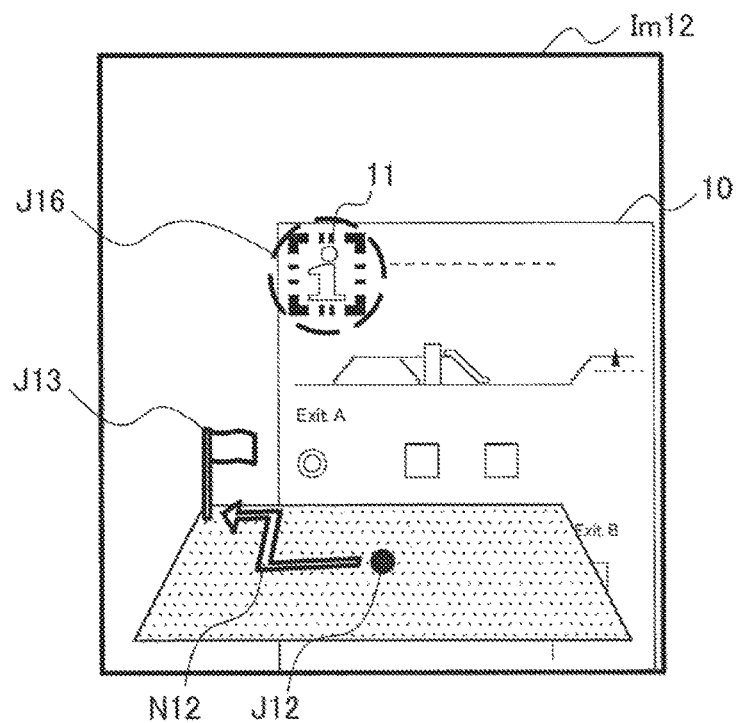
FIG. 13B is a second explanatory view illustrating some examples of display objects that can be displayed in an embodiment.

In a second example of FIG. 13B, a display object N12 and auxiliary display objects J12, J13, and J16 are superimposed on an output image Im12. The display object N12 indicates a direction toward a destination from a current location. However, the display object N12 indicates the direction along a nonlinear route (e.g., a street along which the user can pass) toward the destination, whereas the display object N11 exemplified in FIG. 13A indicates a linear direction toward the destination. The auxiliary display object J16 indicates a detection position of the recognition target 11 in an input image. By visually recognizing the auxiliary display object J16, the user can know that the recognition target has been successfully recognized and can know which part of the image should be captured to achieve highly accurate navigation.

Figure 13C:
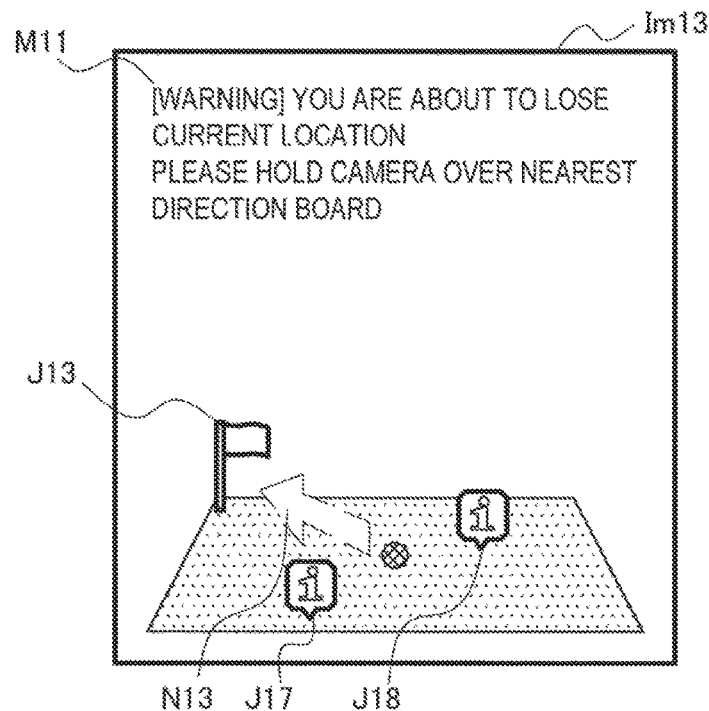
FIG. 13C is a third explanatory view illustrating some examples of display objects that can be displayed in an embodiment.

A third example of FIG. 13C illustrates an output image Im13 that can be displayed while tracking using sensor data is continued. A display object N13, auxiliary display objects J13, J17, and J18, and a message M11 are superimposed on the output image Im13. The display object N13 indicates a direction toward a destination from a current location. However, an outline of the display object N13 is thin. This indicates, to the user, that there is a possibility that accuracy of tracking is reduced. The auxiliary display objects J17 and J18 are icons each of which expresses a position of a direction board (a real object including a recognition target) existing in the vicinity of an estimated current location. The message M1 proposes that the user hold a camera over a nearby direction board.

Figure 13D:
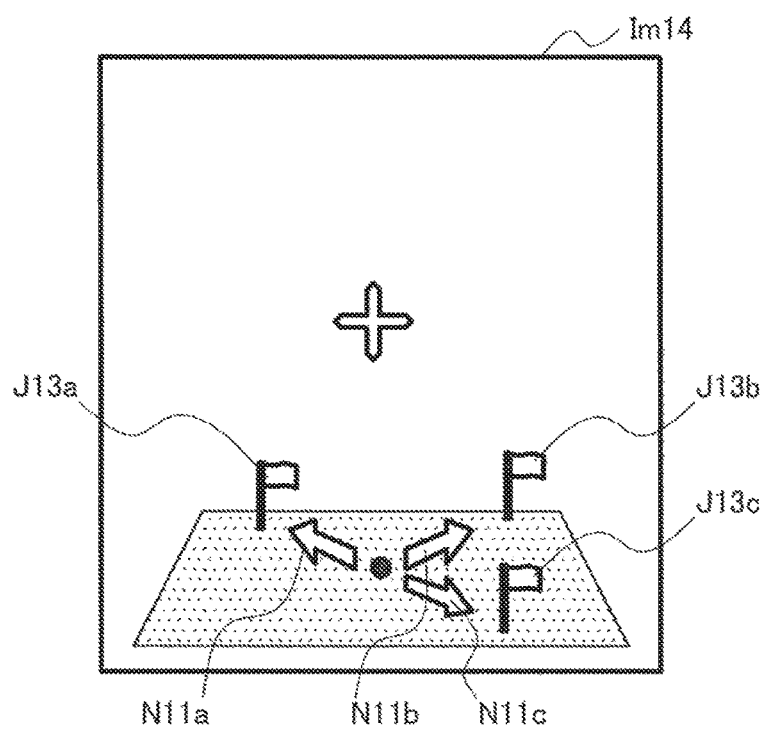
FIG. 13D is a fourth explanatory view illustrating some examples of display objects that can be displayed in an embodiment.

A fourth example of FIG. 13D illustrates an output image Im14 showing a case where a plurality of destinations are navigated. Display objects N11a, N11b, and N11c and auxiliary display objects J13a, J13b, and J13c are superimposed on the output image Im14. The display object N11a indicates a direction toward a first destination from a current location. The auxiliary display object J13a is an icon expressing the first destination. The display object N11b indicates a direction toward a second destination from the current location. The auxiliary display object J13b is an icon expressing the second destination. The display object N11c indicates a direction toward a third destination from the current location. The auxiliary display object J13c is an icon expressing the third destination.

Various display objects exemplified in FIG. 13A to FIG. 13D may be displayed on the screen in any combination.

[2-3. Flow of Processing]

(1) Overall Flow

Figure 14:
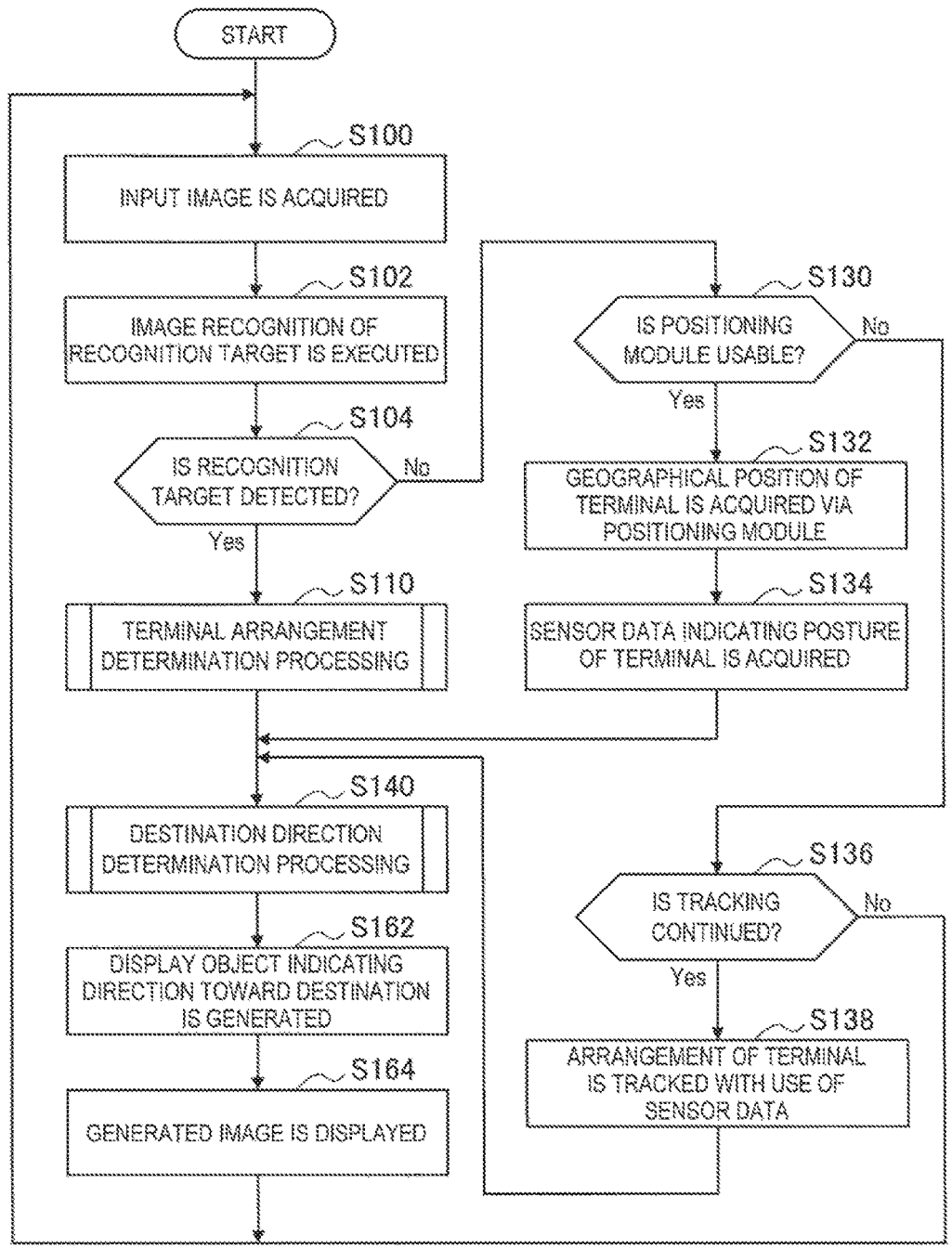
FIG. 14 is a flowchart showing an example of a flow of image processing according to an embodiment.

FIG. 14 is a flowchart showing an example of a flow of image processing executed by the image processing device 100 according to this embodiment. The processing shown in FIG. 14 is repeated for each of a series of input images captured by the camera 102.

When referring to FIG. 14, first, the image acquisition unit 140 acquires, from the camera 102, an input image onto which a real object including a visual recognition target is projected (Step S100). Then, the image acquisition unit 140 outputs the acquired input image to the recognition unit 160 and the control unit 180.

Then, the recognition unit 160 executes image recognition of the recognition target with the use of recognition dictionary data stored by the recognition DB 150 (Step S102). Then, the recognition unit 160 determines whether or not the recognition target has been detected in the input image (Step S104). In the case where the recognition target has been detected, the processing proceeds to Step S110. On the contrary, in the case where the recognition target has not been detected, the processing proceeds to Step S130.

In the case where the recognition target has been detected, the recognition unit 160 recognizes a position and a posture of a terminal at that point by executing terminal arrangement determination processing (Step S110). Some examples of a detailed flow of the terminal arrangement determination processing executed herein will be further described below.

In the case where the recognition target has not been detected, the control unit 180 determines whether or not the positioning module 104 is usable (Step S130). In the case where the positioning module 104 is usable, the control unit 180 acquires a geographical position of the image processing device 100 via the positioning module 104 (Step S132). Further, the control unit 180 acquires, from the sensor module 114, sensor data indicating the posture of the image processing device 100 (Step S134).

In the case where the positioning module 104 is not usable, the control unit 180 determines whether or not tracking of arrangement of the image processing device 100 is continued (Step S136). Tracking of the arrangement can be terminated in response to various events such as a clear instruction from a user, elapse of a predetermined time period from a point at which the recognition target has been previously detected, detection of movement exceeding a threshold, or arrival at a destination. In the case where it is determined that tracking of the arrangement is not continued, the process returns to Step S100, and the above-mentioned processing is repeatedly performed with respect to the next input image. In the case where it is determined that tracking of the arrangement is continued, the control unit 180 tracks the arrangement of the image processing device 100 with the use of the sensor data from the sensor module 114 by adding up a change in the arrangement of the image processing device 100 from a point at which the recognition target has been previously detected (Step S138).

In the case where the arrangement of the image processing device 100 in Step S110, Step S134, or Step S138 at that point is determined, the control unit 180 determines a direction toward a destination in the screen coordinate system of the image processing device 100 by executing destination direction determination processing (Step S140). Some examples of a detailed flow of the destination direction determination processing executed herein will be further described below.

Next, the control unit 180 generates a navigation display object indicating the determined direction (Step S162). The control unit 180 may further generate one or more auxiliary display objects that can express a horizontal surface, a current location, a destination, a sight of recognition, or the like. Then, the control unit 180 generates an output image by superimposing an image of the generated display object on the input image and displays the generated output image on the screen of the display 110 (Step S164). Thereafter, the processing returns to Step S100, and the above-mentioned processing is repeatedly performed with respect to the next input image.

(2-1) Terminal Arrangement Determination Processing—First Example

Figure 15A:
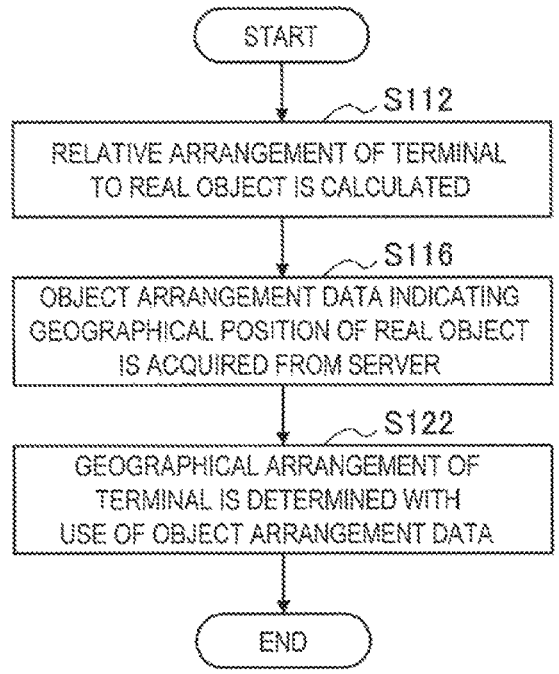
FIG. 15A is a flowchart showing a first example of a detailed flow of terminal arrangement determination processing shown in FIG. 14.

FIG. 15A is a flowchart showing a first example of a detailed flow of the terminal arrangement determination processing shown in FIG. 14. In the first example, object arrangement data is acquired from an external data server.

When referring to FIG. 15A, first, the recognition unit 160 calculates relative arrangement of the image processing device 100 to the recognized real object on the basis of a result of matching of an image feature value extracted from the input image or a pattern included in the input image with feature data included in the recognition dictionary data (Step S112).

Next, the recognition unit 160 transmits a data request to the external data server with the use of identification information of the recognized real object and therefore acquires object arrangement data indicating geographical arrangement of the real object from the data server (Step S116). Then, the recognition unit 160 stores the acquired object arrangement data in the object arrangement DB 170.

Next, the recognition unit 160 determines geographical arrangement of the image processing device 100 on the basis of the geographical arrangement of the real object indicated by the acquired object arrangement data and the relative arrangement of the image processing device 100 to the real object (Step S122).

Note that, in the case where the geographical arrangement of the image processing device 100, i.e., an absolute position and an absolute posture of the terminal in the global coordinate system are not needed for navigation, the processing of Step S122 may be omitted.

(2-2) Terminal Arrangement Determination Processing—Second Example

Figure 15B:
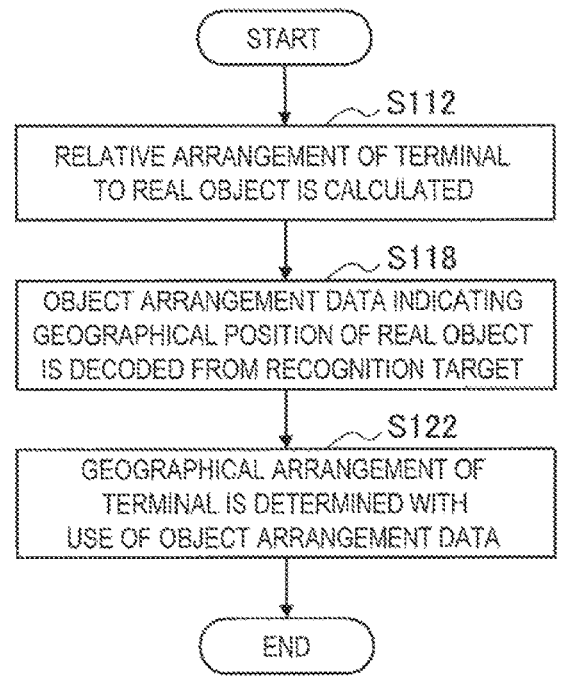
FIG. 15B is a flowchart showing a second example of a detailed flow of terminal arrangement determination processing shown in FIG. 14.

FIG. 15B is a flowchart showing a second example of the detailed flow of the terminal arrangement determination processing shown in FIG. 14. In the second example, object arrangement data is decoded from a detected recognition target.

When referring to FIG. 15B, first, the recognition unit 160 calculates relative arrangement of the image processing device 100 to the recognized real object on the basis of a result of matching of an image feature value extracted from the input image or a pattern included in the input image with feature data included in the recognition dictionary data (Step S112).

Next, the recognition unit 160 decodes object arrangement data encoded in the recognition target and therefore acquires the object arrangement data indicating geographical arrangement of the real object including the recognition target (Step S18). Then, the recognition unit 160 stores the acquired object arrangement data in the object arrangement DB 170.

Next, the recognition unit 160 determines geographical arrangement of the image processing device 100 on the basis of the geographical arrangement of the real object indicated by the acquired object arrangement data and the relative arrangement of the image processing device 100 to the real object (Step S122).

(2-3) Terminal Arrangement Determination Processing—Third Example

Figure 15C:
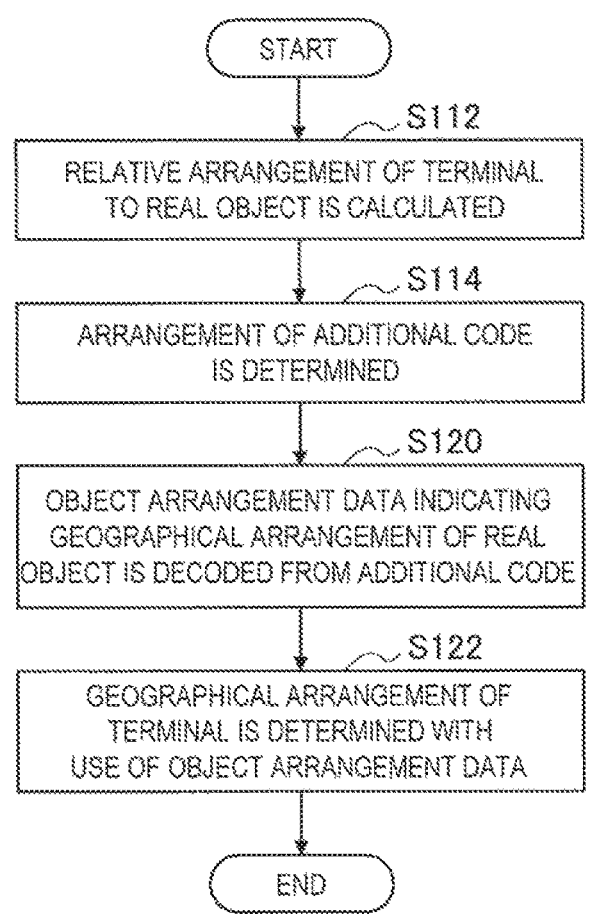
FIG. 15C is a flowchart showing a third example of a detailed flow of terminal arrangement determination processing shown in FIG. 14.

FIG. 15C is a flowchart showing a third example of the detailed flow of the terminal arrangement determination processing shown in FIG. 14. In the third example, object arrangement data is decoded from an additional code added to a surface of the real object in association with the detected recognition target.

When referring to FIG. 15C, first, the recognition unit 160 calculates relative arrangement of the image processing device 100 to the recognized real object on the basis of a result of matching of an image feature value extracted from the input image or a pattern included in the input image with feature data included in the recognition dictionary data (Step S112).

Then, the recognition unit 160 determines arrangement of the additional code in the input image with the use of the additional code arrangement data included in the recognition dictionary data (Step S114).

Next, the recognition unit 160 decodes object arrangement data encoded in the additional code and therefore acquires the object arrangement data indicating geographical arrangement of the real object (Step S120). The recognition unit 160 may deform, for example, the input image so that the surface to which the additional code is added faces the input image and then apply recognition processing for reading the additional code to a partial image including the additional code. Then, the recognition unit 160 stores the acquired object arrangement data in the object arrangement DB 170.

Next, the recognition unit 160 determines geographical arrangement of the image processing device 100 on the basis of the geographical arrangement of the real object indicated by the acquired object arrangement data and the relative arrangement of the image processing device 100 to the real object (Step S122).

(3-1) Destination Direction Determination Processing—First Example

FIG. 16A is a flowchart showing a first example of a detailed flow of the destination direction determination processing shown in FIG. 14. In the first example, the direction toward the destination is determined on the basis of a geographical position of the destination and geographical arrangement of the terminal.

When referring to FIG. 16A, first, the control unit 180 determines one or more destinations to be navigated (Step S142). For example, the control unit 180 may determine destinations selected by the user as targets to be navigated via a user interface such as the interface exemplified in any one of FIG. 12A to FIG. 12C. Instead of this, the control unit 180 may automatically determine, as a target to be navigated, one or more spots existing in the vicinity thereof, a spot selected in accordance with a route of navigation, or a spot selected for advertisement.

Next, the control unit 180 acquires geographical positions of the determined destinations from the object arrangement data stored in the object arrangement DB 170 (Step S144).

Next, the control unit 180 calculates directions toward the destinations in the screen coordinate system of the image processing device 100 on the basis of the acquired geographical positions of the destinations and the geographical arrangement of the image processing device 100 (Step S148).

(3-2) Destination Direction Determination Processing—Second Example

FIG. 16B is flowchart showing a second example of the detailed flow of the destination direction determination processing shown in FIG. 14. In the second example, the direction toward the destination is determined on the basis of a relative position of the destination to the real object and relative arrangement of the terminal thereto.

When referring to FIG. 16B, first, the control unit 180 determines one or more destinations as targets to be navigated in the same way as the first example (Step S142).

Next, the control unit 180 acquires the relative positions of the determined destinations to the real object from the object arrangement data stored in the object arrangement DB 170 (Step S146).

Next, the control unit 180 calculates directions toward the destinations in the screen coordinate system of the image processing device 100 on the basis of the acquired relative positions of the destinations and the relative arrangement of the image processing device 100 (Step S150).

<3. Application Examples>

[3-1. Stamp Rally]

The technique according to the present disclosure is applicable to various uses. The use of the technique for a stamp rally will be herein described as an example. The stamp rally is an event in which a user generally visits a plurality of spots sharing some theme in turn and impresses a stamp provided in each spot on a stamp card so as to enjoy collecting stamps or obtain benefits based on a collection result. Instead of impressing a stamp on a stamp card, there is a method in which a user captures an image of a mark provided in each spot to prove that the user has visited each spot.

In such a stamp rally, the technique according to the present disclosure can be used for guiding the user to the next spot to be visited. FIG. 17 is an explanatory view illustrating some examples of display objects that can be displayed in an application example of the stamp rally. A display object N21 and an auxiliary display object J21 are superimposed on an output image Im21 illustrated in a left part of FIG. 17. The display object N21 indicates a direction toward the next spot in the stamp rally from a current location. The auxiliary display object J21 is an icon expressing the next spot serving as a destination.

A real object 40 is projected onto an output image Im22 illustrated in a right part of FIG. 17. The real object 40 is a poster posted in a spot of the stamp rally. That is, the user reaches a single spot at this point and then heads for the next spot. A recognition target 41 is printed on a printed surface of the poster 40. The recognition unit 160 of the image processing device 100 recognizes relative arrangement of the image processing device 100 to the poster 40 by executing image recognition of the recognition target 41. Then, the control unit 180 determines a direction toward the next spot with the use of the relative arrangement of the image processing device 100 and object arrangement data acquired regarding the poster 40. A display object N22 and an auxiliary display object J21 are superimposed on the output image Im22. The auxiliary display object J21 is emphasized to notify the user that he/she has reached the spot where the poster 40 is posted. The display object N22 indicates the direction toward the next spot determined on the basis of the image recognition.

In the use of the technique for the stamp rally, a recognition target common to the plurality of spots and additional codes for identifying the individual spots may be prepared. Instead of this, different recognition targets may be prepared in the plurality of spots.

[3-2. Use of HMD]

As described above, the technique according to the present disclosure may be achieved with the use of an HMD terminal. FIG. 18 is an explanatory view illustrating a modification example of an image processing device. In the example of FIG. 18, an image processing device 200 is an eyeglass-type HMD terminal mounted on a user's head. The image processing device 200 includes a casing 201, a camera 202, a contact surface 206, and a pair of screens 210a and 210b. The casing 201 has a frame supporting the screens 210a and 210b and so-called temples positioning at temporal regions of the user. The temples include some modules for image processing, such as a memory and a processor. Those modules have functions equivalent to the various logical functions of the image processing device 100 shown in FIG. 5. The camera 202 is arranged so that an optical axis of a lens thereof is substantially parallel to gaze of the user and is used for capturing an image. The contact surface 206 is a surface for detecting touch by the user and is used for allowing the image processing device 200 to accept input from the user. The screens 210a and 210b are see-through or non-see-through screens arranged in front of a left eye and a right eye of the user.

FIG. 19 is an explanatory view illustrating some examples of display objects that can be displayed in the modification example of FIG. 18. When referring to FIG. 19, a display object N31, a display object H31, and an auxiliary display object J31 are displayed on the screen of the image processing device 200. The display object N31 is a navigation object indicating a direction toward a destination from a current location. The display object H31 is an object expressing a horizontal surface. The auxiliary display object J31 is an object indicating a detection position of a recognition target in an input image. The auxiliary display object J31 may be a static icon or animation. In the example of FIG. 19, the recognition target 11 of the real object 10 is detected.

In the use of the HMD, by displaying the navigation display object in an end portion of the screen as illustrated in the example of FIG. 19, it is possible to safely provide a navigation service without obstructing visibility of the user. A user interface for, for example, selecting a destination may be displayed on the screens 210a and 210b or may be displayed on a screen of another device (e.g., a smartphone held by the user) linked with the image processing device 200.

[3-3. Link Between a Plurality of Devices]

The technique according to the present disclosure may be achieved by linking a plurality of devices with one another. For example, the above-mentioned functions of the recognition unit 160 and the control unit 180 may be partially executed by a device that is physically different from the image processing device 100 or 200.

FIG. 20 is an explanatory view illustrating a link between a plurality of devices. FIG. 20 illustrates the image processing device 100 and a server device 300 communicating with the image processing device 100. The server device 300 may be arranged in a personal network constructed in the vicinity of a user or a home network or may be arranged in a remote network such as the Internet. The image processing device 100 transmits, for example, an input image to the server device 300 (SIG1). The server device 300 is a device having the functions of the recognition unit 160 and the control unit 180 shown in FIG. 5. The server device 300 executes image recognition of the input image received from the image processing device 100 and recognizes a real object including a recognition target. Then, the server device 300 transmits information based on a result of the image recognition to the image processing device 100 (SIG2). The information transmitted to the image processing device 100 from the server device 300 may be a parameter indicating relative arrangement of the image processing device 100 to the real object, a parameter indicating a direction toward a destination of the user, or graphic data of a display object indicating the direction toward the destination. The image processing device 100 displays, on the screen, an output image on which the display object indicating the direction toward the destination is superimposed with the use of the information received from the server device 300. According to such configuration, even in the case where the image processing device 100 only includes a small amount of a processing resource, it is possible to provide a navigation service to the user.

<4. Conclusion>

An embodiment of the technique according to the present disclosure has been described in detail with reference to FIG. 1 to FIG. 20. According to the above-mentioned embodiment, relative arrangement of a terminal that has captured an image to a real object is recognized by executing image recognition of a visual recognition target that the real object includes, and a display object indicating a direction toward a destination is displayed on a screen of the terminal on the basis of the recognized relative arrangement. Therefore, it is possible to provide navigation toward a destination to a user without depending on a positioning module.

As an example, the destination may be selected by the user via a screen displaying a list or map of destination candidates associated with the captured real object. According to such a configuration, a main spot existing in the vicinity of the real object including the recognition target can be easily selected by the user as a destination. Further, as an application example, in the case where the user captures an image of a poster on which an image of an advertised product is printed, a nearby store where the advertised product is sold can be selected by the user to guide the user to the store. Instead of this, the destination may be selected by the user in advance. Further, one or more destinations may be automatically selected.

As an example, the direction toward the destination can be determined on the basis of relative arrangement of the terminal, geographical arrangement of the real object, and a geographical position of the destination. Because the geographical arrangement of the real object and the geographical position of the destination are not normally changed, according to such a configuration, it is possible to appropriately determine the direction toward the destination with the use of arrangement of the terminal that is dynamically recognized and data defined in advance. As another example, the direction toward the destination can be determined on the basis of the relative arrangement of the terminal and a relative position of the destination to the real object. Also in this case, it is possible to appropriately determine the direction toward the destination with the use of the arrangement of the terminal that is dynamically recognized and the data defined in advance.

In the case where data defining the arrangement of the real object or the position of the destination is dynamically acquired from a data server, there is no need to distribute the data to each terminal in advance, and therefore it is easy to introduce the above-mentioned mechanism. Meanwhile, in the case where the data defining the arrangement of the real object or the position of the destination is visually encoded on a surface of the real object, it is also not necessary to distribute the data to each terminal in advance, and, further, each terminal does not need to communicate with the data server. Therefore, it is possible to provide a navigation service to the user even in a state in which neither a positioning module nor a wireless communication module is usable.

Further, according to the above-mentioned embodiment, arrangement of the terminal is tracked with the use of sensor data from a sensor that the terminal includes, and the display object indicating the direction toward the destination is continuously displayed on the screen. This makes it possible to continuously provide the navigation service to the user while the user is moving.

Note that a series of control processing using each device described in this specification may be realized by any one of software, hardware, and a combination of software and hardware. Programs configuring software are stored in advance in, for example, storage media (non-transitory media) provided inside or outside the devices. For example, each program is read into a random access memory (RAM) at the time of executing the program and is executed by a processor such as a CPU.

The processing described with reference to the flowcharts in this specification does not necessarily need to be executed in order shown in the flowcharts. Some processing steps may be executed in parallel. Additional processing step may be employed and some processing steps may be omitted.

Although the preferred embodiments of the present disclosure have been described in detail with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below (1)

An image processing device including:

an image acquisition unit configured to acquire an image onto which a real object including a visual recognition target is projected;

a recognition unit configured to recognize relative arrangement of a terminal that has captured the image to the real object by executing image recognition of the recognition target; and a control unit configured to display a display object indicating a direction toward a destination of a user on a screen of the terminal on the basis of the relative arrangement of the terminal recognized by the recognition unit.

(2)

The image processing device according to (1), wherein the control unit displays a list or map of destination candidates associated with the real object on the screen so as to allow the user to select the destination.

(3)

The image processing device according to (1), wherein the destination is selected by the user in advance.

(4)

The image processing device according to any one of (1) to (3), wherein, in a case where a single destination is not selected by the user, the control unit displays, on the screen, a plurality of display objects indicating respective directions toward a plurality of destination candidates associated with the real object.

(5)

The image processing device according to any one of (1) to (4), wherein the control unit displays, on the screen, an auxiliary display object indicating a detection position of the recognition target in the image.

(6)

The image processing device according to any one of (1) to (5), wherein the display object indicates the direction along a linear direction or nonlinear route toward the destination.

(7)

The image processing device according to any one of (1) to (6), wherein the control unit determines the direction to be indicated by the display object on the basis of the relative arrangement of the terminal, geographical arrangement of the real object, and a geographical position of the destination.

(8)

The image processing device according to any one of (1) to (6), wherein the control unit determines the direction to be indicated by the display object on the basis of the relative arrangement of the terminal and a relative position of the destination to the real object.

(9)

The image processing device according to any one of (1) to (8), wherein the control unit continuously displays the display object on the screen by tracking arrangement of the terminal with use of sensor data from a sensor that the terminal includes.

(10)

The image processing device according to (9), wherein, in a case where a positioning module configured to measure a geographical position of the terminal is usable, the control unit corrects the arrangement of the tracked terminal with use of positioning data from the positioning module.

(11)

The image processing device according to (7), wherein the geographical arrangement of the real object is indicated by arrangement data acquired from a data server.

(12)

The image processing device according to (7),
wherein the geographical arrangement of the real object is decoded from the recognition target or an additional code on a surface of the real object associated with the recognition target.

(13)

The image processing device according to (8).
wherein the relative position of the destination is indicated by arrangement data acquired from a data server.

(14)

The image processing device according to (8),
wherein the relative position of the destination is decoded from the recognition target or an additional code on a surface of the real object associated with the recognition target.

(15)

The image processing device according to any one of (1) to (14),
wherein the image processing device is the terminal.

(16)

The image processing device according to any one of (1) to (14),
wherein the image processing device is a server device communicated with the terminal.

(17)

An image processing method executed by an image processing device, the image processing method including:
acquiring an image onto which a real object including a visual recognition target is projected;
recognizing relative arrangement of a terminal that has captured the image to the real object by executing image recognition of the recognition target; and
displaying a display object indicating a direction toward a destination of a user on a screen of the terminal on the basis of the recognized relative arrangement of the terminal.

(18)

A program causing a computer that controls an image processing device to function as:
an image acquisition unit configured to acquire an image onto which a real object including a visual recognition target is projected;
a recognition unit configured to recognize relative arrangement of a terminal that has captured the image to the real object by executing image recognition of the recognition target; and
a control unit configured to display a display object indicating a direction toward a destination of a user on a screen of the terminal on the basis of the relative arrangement of the terminal recognized by the recognition unit.

REFERENCE SIGNS LIST 10 real object
11 recognition target
100, 200 image processing device
140 image acquisition unit
160 recognition unit
180 control unit
171a, b object arrangement data

The invention claimed is:

1. An image processing device comprising:
an image acquisition unit configured to acquire an image onto which a real object including a visual recognition target is projected;
a recognition unit configured to recognize a geographical position of a terminal that has captured the image and a relative arrangement of the terminal to the real object by executing image recognition of the visual recognition target; and
a control unit configured to determine a destination selected by a user and display a display object indicating a direction toward the destination on a screen of the terminal based on the relative arrangement of the terminal to the real object,
wherein the control unit is further configured to
acquire a relative position of the destination to the real object, and
obtain a relative position of the destination to terminal based on the relative arrangement of the terminal to the real object and the relative position of the destination to the real object, and
wherein the image acquisition unit, the recognition unit, and the control unit are each implemented via at least one processor.

2. The image processing device according to claim 1,
wherein the control unit displays a list or map of destination candidates associated with the real object on the screen so as to allow the user to select the destination.

3. The image processing device according to claim 1,
wherein the destination is selected by the user in advance.

4. The image processing device according to claim 1,
wherein, in a case where a single destination is not selected by the user, the control unit displays, on the screen, a plurality of display objects indicating respective directions toward a plurality of destination candidates associated with the real object.

5. The image processing device according to claim 1,
wherein the control unit displays, on the screen, an auxiliary display object indicating a detection position of the visual recognition target in the image.

6. The image processing device according to claim 1,
wherein the display object indicates the direction along a linear direction or nonlinear route toward the destination.

7. The image processing device according to claim 1,
wherein the control unit determines the direction to be indicated by the display object based on the relative arrangement of the terminal to the real object, a geographical arrangement of the real object, and a geographical position of the destination.

8. The image processing device according to claim 7,
wherein the geographical arrangement of the real object is indicated by arrangement data acquired from a data server.

9. The image processing device according to claim 7,
wherein the geographical arrangement of the real object is decoded from the visual recognition target or an additional code on a surface of the real object associated with the visual recognition target.

10. The image processing device according to claim 7,
wherein the geographical arrangement of the real object comprises at least one or more selected from a group consisting of a latitude, longitude, altitude, and direction of the real object.

11. The image processing device according to claim 1,
wherein the control unit determines the direction to be indicated by the display object based on the relative arrangement of the terminal to the real object and a relative position of the destination to the real object.

12. The image processing device according to claim 11,
wherein the relative position of the destination to the real object is indicated by arrangement data acquired from a data server.

13. The image processing device according to claim 11, wherein the relative position of the destination to the real object is decoded from the visual recognition target or an additional code on a surface of the real object associated with the visual recognition target.

14. The image processing device according to claim 1, wherein the control unit continuously displays the display object on the screen by tracking arrangement of the terminal with use of sensor data from a sensor that the terminal includes.

15. The image processing device according to claim 14, further comprising:
a positioning module configured to measure the geographical position of the terminal,
wherein the control unit corrects the tracked arrangement of the terminal using positioning data provided from the positioning module.

16. The image processing device according to claim 1, wherein the image processing device is the terminal.

17. The image processing device according to claim 1, wherein the image processing device is a server device communicated with the terminal.

18. The image processing device according to claim 1, wherein the control unit is further configured to determine a vector corresponding to the direction toward the destination in a screen coordinate system of the terminal by adding a relative position of the destination to the real object with the relative arrangement of the terminal to the real object.

19. The image processing device according to claim 1, wherein as a result of the image recognition, the recognition unit generates a homogeneous transformation matrix in a screen coordinate system of the terminal, the homogeneous transformation matrix expresses the relative arrangement of the terminal to the real object.

20. An image processing method executed using at least one processor, the image processing method comprising:
acquiring an image onto which a real object including a visual recognition target is projected;
recognizing a geographical position of a terminal that has captured the image and a relative arrangement of the terminal to the real object by executing image recognition of the visual recognition target;
determining a destination selected by a user;
displaying a display object indicating a direction toward the destination on a screen of the terminal based on the relative arrangement of the terminal to the real object;
acquiring a relative position of the destination to the real object; and
obtaining a relative position of the destination to terminal based on the relative arrangement of the terminal to the real object and the relative position of the destination to the real object.

21. A non-transitory computer-readable medium having embodied thereon a program, which when executed by a computer causes the computer to execute a method, the method comprising:
acquiring an image onto which a real object including a visual recognition target is projected;
recognizing a geographical position of a terminal that has captured the image and a relative arrangement of the terminal to the real object by executing image recognition of the visual recognition target;
determining a destination selected by a user;
displaying a display object indicating a direction toward the destination on a screen of the terminal based on the relative arrangement of the terminal to the real object;
acquiring a relative position of the destination to the real object; and
obtaining a relative position of the destination to terminal based on the relative arrangement of the terminal to the real object and the relative position of the destination to the real object.

* * * * *